(12) United States Patent
Chin et al.

(10) Patent No.: US 8,989,142 B2
(45) Date of Patent: Mar. 24, 2015

(54) RESIDENTIAL/ENTERPRISE NETWORK CONNECTION MANAGEMENT AND CSFB SCENARIOS

(75) Inventors: Chen Ho Chin, Deerlijk (BE); Noun Choi, Flower Mound, TX (US); Stefano Faccin, Hayward, CA (US)

(73) Assignee: Blackberry Limited, Waterloo, Ontario (CA)

( * ) Notice: Subject to any disclaimer, the term of this patent is extended or adjusted under 35 U.S.C. 154(b) by 146 days.

(21) Appl. No.: 13/576,432

(22) PCT Filed: Sep. 27, 2011

(86) PCT No.: PCT/US2011/053512
§ 371 (c)(1),
(2), (4) Date: Aug. 1, 2012

(87) PCT Pub. No.: WO2012/050842
PCT Pub. Date: Apr. 19, 2012

(65) Prior Publication Data
US 2012/0300750 A1    Nov. 29, 2012

Related U.S. Application Data

(60) Provisional application No. 61/387,310, filed on Sep. 28, 2010.

(51) Int. Cl.
*H04B 7/00* (2006.01)
*H04W 4/00* (2009.01)
*G06F 15/173* (2006.01)

(52) U.S. Cl.
USPC ............ 370/331; 370/310; 370/328; 709/238

(58) Field of Classification Search
USPC .......... 370/252–259, 328–339; 455/423–435, 455/445–458
See application file for complete search history.

(56) References Cited

U.S. PATENT DOCUMENTS 6,961,780 B2 * 11/2005 Kuusinen et al. ............. 709/238
7,251,227 B2    7/2007 de Jong
(Continued)

FOREIGN PATENT DOCUMENTS

KR    10-2010-0119349    11/2010
WO    WO2011142567 A2    11/2011

OTHER PUBLICATIONS

3GPP TS 23.003 V11.0.0; 3rd Generation Partnership Project; Technical Specification Group Core Network and Terminals; Numbering, Addressing and Identification; Release 11; Dec. 2011; 81 pages.
(Continued)

*Primary Examiner* — Man Phan
(74) *Attorney, Agent, or Firm* — Trop Pruner & Hu, P.C.

(57) ABSTRACT

A method, system and device are provided for managing LIPA and/or SIPTO connection releases when UE moves out of residential/enterprise network coverage in case service continuity is not supported for the LIPA/SIPTO PDN connection(s). To address problems caused by not providing service continuity for LIPA/SIPTO PDN connections, the PDN connection/PDP context created in the HeNB/HNB by the MME/SGSN includes context information related to the UE indicating whether such connection is a LIPA PDN connection PDN connection or not. In addition, each UE may be configured to reconnect or not reconnect to the PDN corresponding to a certain APN or service, depending on how the PDN connection was disconnected by the network.

21 Claims, 11 Drawing Sheets

(56) References Cited

U.S. PATENT DOCUMENTS

| | | | |
|---|---|---|---|
| 8,369,253 B2* | 2/2013 | Faccin et al. | 370/310.2 |
| 8,477,724 B2* | 7/2013 | Bakker et al. | 370/331 |
| 2006/0193289 A1 | 8/2006 | Ronneke | |
| 2008/0102896 A1 | 5/2008 | Wang | |
| 2009/0232022 A1 | 9/2009 | Savolainen | |
| 2009/0305699 A1 | 12/2009 | Deshpande | |
| 2010/0098023 A1* | 4/2010 | Aghili et al. | 370/331 |
| 2010/0216484 A1 | 8/2010 | Zhou | |
| 2010/0224563 A1* | 9/2010 | Singh et al. | 210/651 |
| 2010/0272013 A1* | 10/2010 | Horn et al. | 370/328 |
| 2010/0284333 A1* | 11/2010 | Shirota et al. | 370/328 |
| 2011/0002267 A1* | 1/2011 | Dwyer et al. | 370/328 |
| 2011/0045826 A1 | 2/2011 | Kim | |
| 2011/0045834 A1 | 2/2011 | Kim | |
| 2011/0075675 A1 | 3/2011 | Koodli | |
| 2011/0116449 A1* | 5/2011 | Hu et al. | 370/328 |
| 2011/0117931 A1* | 5/2011 | Hu et al. | 455/456.1 |
| 2011/0171953 A1* | 7/2011 | Faccin et al. | 455/426.1 |
| 2011/0310799 A1 | 12/2011 | Horn | |
| 2011/0312321 A1* | 12/2011 | Ramachandran et al. | 455/426.1 |
| 2012/0028638 A1 | 2/2012 | Mueck | |
| 2012/0039303 A1* | 2/2012 | Stenfelt et al. | 370/331 |
| 2012/0083273 A1 | 4/2012 | Mukherjee | |
| 2012/0120789 A1* | 5/2012 | Ramachandran et al. | 370/220 |
| 2012/0189016 A1 | 7/2012 | Bakker | |
| 2013/0143515 A1* | 6/2013 | Zhu et al. | 455/404.1 |
| 2013/0188604 A1 | 7/2013 | Chin | |
| 2013/0308527 A1 | 11/2013 | Chin | |

OTHER PUBLICATIONS

3GPP TS 23.060 V11.0.0; 3rd Generation Partnership Project; Technical Specification Group Services and System Aspects; General Packet Radio Service (GPRS); Service Description; Stage 2; Release 11; Dec. 2011; 326 pages.
3GPP TS 23.203 V11.4.0; 3rd Generation Partnership Project; Technical Specification Group Services and System Aspects; Policy and Charging Control Architecture; Release 11; Dec. 2011; 167 pages.
3GPP TS 24.301 V11.1.0; 3rd Generation Partnership Project; Technical Specification Group Core Network and Terminals; Non-Access-Stratum (NAS) Protocol for Evolved Packet System (EPS); Stage 3; Release 11; Dec. 2011; 326 pages.
3GPP TS 23.401 V11.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 11; Dec. 2011; 287 pages.
3GPP TR 23.829 V10.0.1; 3rd Generation Partnership Project; Technical Specification Group Services and System Aspects; Local IP Access and Selected IP Traffic Offload (LIPA-SIPTO); Release 10; Oct. 2011; 43 pages.
3GPP TR 23.830 V9.0.0; 3rd Generation Partnership Project; Technical Specification Group Services and System Aspects; Architecture Aspects of Home NodeB and Home eNodeB; Release 9; Sep. 2009; 55 pages.
3GPP TS 29.274 V11.1.0; 3rd Generation Partnership Project; Technical Specification Group Core Network and Terminals; 3GPP Evolved Packet System (EPS); Evolved General Packet Radio Service (GPRS); Tunnelling Protocol for Control Plane (GTPv2-C); Stage 3; Release 11; Dec. 2011; 202 pages.
3GPP TS 32.251 V11.1.0; 3rd Generation Partnership Project; Technical Specification Group Services and System Aspects; Telecommunication Management; Charging Management; Packet Switched (PS) Domain Charging; Release 11; Dec. 2011; 82 pages.
3GPP TS 36.300 V11.0.0; 3rd Generation Partnership Project; Technical Specification Group Radio Access Network; Evolved Universal Terrestrial Radio Access (E-UTRA) and Evolved Universal Terrestrial Radio Access Network (E-UTRAN); Overall Description; Stage 2; Release 11; Dec. 2011; 194 pages.
3GPP TSG-SA WG1 Meeting #49; "SIPTO Requirements Common for Macro Network and H(e)NB Subsystems"; S1-100321; Beijing, China; Nov. 16-20, 2009; 3 pages.

3GPP TSG-SA WG1 Meeting #49; "Mobility for Local IP Access (LIPA)"; S1-100316; San Francisco, USA; Feb. 22-26, 2010; 2 pages.
3GPP TSG SA WG2 Meeting #75; "LIPA and SIPTO Node Functions"; S2-096050; Kyoto, Japan; Aug. 31-Sep. 4, 2009; 8 pages.
3GPP TSG SA WG2 Meeting #75; "Terminology Updated to Agreed Text in TR 23.8xy"; S2-096006; Kyoto, Japan; Aug. 31-Sep. 4, 2009; 5 pages.
3GPP TSG SA WG2 Meeting #75; "Architectural Requirements of Internet Offload"; S2-095900; Kyoto, Japan; Aug. 31-Sep. 4, 2009; 3 pages.
3GPP TS 36.413 V9.3.0; 3rd Generation Partnership Project; Technical Specification Group Radio Access Network; Evolved Universal Terrestrial Radio Access Network (E-UTRAN); S1 Application Protocol (S1AP); Release 9; Jun. 2010; 242 pages.
3GPP TS 23.272 V10.0.0; 3rd Generation Partnership Project; Technical Specification Group Servicse and System Aspects; Circuit Switched (CS) fallback in Evolved Packet System (EPS); Stage 2; Release 10; Jun. 2010; 74 pages.
3GPP TSG SA WG2 Meeting #80; "LIPA deactivation"; S2-104303; Brundstad, Norway; Aug. 30-Sep. 3, 2010; 16 pages.
3GPP TSG SA WG2 Meeting #80, "Addition of correlation identifier for optimised routing in LIPA"; S2-104314, Brunstad, Norway; Aug. 30-Sep. 3, 2010; 4 pages.
3GPP TSG SA WG2 Meeting #80, "The PDN disconnection during inter-RAT HO procedure"; S2-104064, Brunstad, Norway; Aug. 30-Sep. 3, 2010; 40 pages.
3GPP TSG SA WG2 Meeting #79; "Introduction of SIPTO in EPS (extended version)"; S2-102291, Kyoto, Japan; May 10-14, 2010; 14 pages.
3GPP TSG SA WG2 Meeting #76; "Discussion of LIPA_SIPTO Solution"; TD S2-096637, Cabo, Mexico; Nov. 16-20, 2009; 6 pages.
3GPP TSG SA WG2 Meeting #77; "Proposed solution of architecture variant 1"; TD S2-100007, Shenzhen, China; Jan. 18-22, 2010; 6 pages.
3GPP TSG SA WG2 Meeting #80, "LIPA deactivation"; S2-104399, Brunstad, Norway; Aug. 30-Sep. 3, 2010; 22 pages.
3GPP TSG SA WG2 Meeting #79; "Fix LIPA open issues"; TD S2-102386, Kyoto, Japan; May 10-14, 2010; 8 pages.
3GPP TSG SA WG2 Meeting #78; "Further analysis for LIPA/SIPTO solution for H(e)NB using a local PDN connection in Solution 1"; TD S2-101737, San Francisco, California, Feb. 22-26, 2010; 16 pages.
3GPP TSG SA WG2 Meeting #80; "LIPA deactivation"; S2-104400, Brunstad, Norway, Aug. 30-Sep. 3, 2010; 16 pages.
3GPP TSG SA WG2 Meeting #80; "LIPA permissions and CSG information for LIPA-able APNs in the HSS"; S2-104392, Brunstad Norway, Aug. 30-Sep. 3, 2010; 8 pages.
U.S. Appl. No. 13/355,283, Non-Final Office Action dated Jan. 31, 2014, pp. 1-10 and attachments.
Korean Intellectual Property Office, International Search Report for PCT/US2012/022082 dated Jul. 30, 2012 (3 pages).
Korean Intellectual Property Office, Written Opinion for PCT/US2012/022082 dated Jul. 30, 2012 (4 pages).
The International Bureau of WIPO, International Preliminary Report on Patentability for PCT/US2012/022082 dated Jul. 23, 2013 (5 pages).
European Patent Office, International Search Report and Written Opinion of PCT/U52011/053505 dated Jan. 26, 2012 (16 pages).
The International Bureau of WIPO, International Preliminary Report on Patentability for PCT/US2011/053505 dated Apr. 2, 2013 (10 pages).
European Patent Office, International Search Report and Written Opinion for PCT/US2011/053512 dated Feb. 3, 2012 (20 pages).
The International Bureau of WIPO, International Preliminary Report on Patentability for PCT/US2011/053512 dated Apr. 2, 2013 (13 pages).
European Patent Office, International Search Report and Written Opinion for PCT/US2011/053525 dated Feb. 2, 2012 (33 pages).
The International Bureau of WIPO, International Preliminary Report on Patentability for PCT/US2011/053525 dated Apr. 2, 2013 (17 pages).

(56) References Cited

OTHER PUBLICATIONS

3GPP TS 23.401 V10.0.0; 3rd Generation Partnership Project; Technical Specification Group Services and System Aspects; General Packet Radio Service (GPRS) Enhancements for Evolved Universal Terrestrial Radio Access Network (E-UTRAN) Access; Release 10; Jun. 2010; 261 pages.

European Patent Office, International Search Report for PCT/US2011/053520 dated Dec. 20, 2011 (2 pages).

3GPP TSG SA WG2 Meeting #80, S2-103361, Change Request 23.401 CR 1647, Version 10.0.0, LIPA deactivation dated Aug. 30-Sep. 3, 2010 (10 pages).

3GPP TSG SA WG2 Meeting #80, S2-103362, Change Request 23.060 CR 1124, Version 10.0.0, LIPA deactivation dated Aug. 30-Sep. 3, 2010 (14 pages).

U.S. Appl. No. 13/246,573, Non-Final Office Action dated Dec. 10, 2013, pp. 1-11 and attachments.

U.S. Appl. No. 13/246,573, Notice of Allowance dated Sep. 4, 2014, pp. 1-14 and attachments.

U.S. Appl. No. 13/355,283, Non-Final Rejection dated Sep. 18, 2014, pp. 1-14 and attachments.

U.S. Appl. No. 13/876,019, Non-Final Rejectin dated Aug. 4, 2014, pp. 1-9 and attachments.

U.S. Appl. No. 13/246,573, Final Rejection dated Jun. 12, 2014, pp. 1-16 and attachments.

\* cited by examiner

RESIDENTIAL/ENTERPRISE NETWORK CONNECTION MANAGEMENT AND CSFB SCENARIOS

CROSS-REFERENCE TO RELATED APPLICATIONS

This application is a national stage application under 35 U.S.C. §371 of PCT/US2011/053512, filed Sep. 27, 2011, which claims priority to Provisional Patent Application No. 61/387,310, filed Sep. 28, 2010.

FIELD OF THE INVENTION

The present disclosure is directed in general to communications systems and methods for operating same. In one aspect, the present disclosure relates to the methods, systems and devices for managing local IP access (LIPA) connection releases resulting from mobility of a user equipment.

DESCRIPTION OF THE RELATED ART

Within the 3rd Generation Partnership Project (3GPP), standards are being developed for the interface between the mobile core network and a femtocell which is a small cellular base station, typically designed for use in a home or small business. Home NodeB (HNB), Home eNB (HeNB) and femto cell are concepts introduced for Universal Mobile Telecommunications System (UMTS) and Long Term Evolution (LTE) evolved UMTS Terrestrial Radio Access Network (E-UTRAN) to improve indoor and micro-cell coverage as well as to leverage wireline backhaul to the "home." A femtocell is widely used outside of 3GPP to mean any cell with a very small coverage, and typically installed in a private premises (either private or corporate or residential/enterprise). The Home NodeB (HNB), Home eNB (HeNB) and femto cell can have a residential or enterprise IP network. The terms HeNB/HNB are used in 3GPP with specific meanings, i.e. that the cell is a closed subscriber group (CSG) or hybrid cell. A CSG identifies subscribers of an operator who are permitted to access one or more cells of the public land mobile network (PLMN) but which have restricted access. A H(e)NB subsystem supports Local IP Access in order to provide access for IP-capable user equipment (UE) devices connected via a H(e)NB subsystem (i.e. using H(e)NB radio access) to other IP capable entities in the same residential IP network or enterprise IP network. The term macrocell, while not having significance in 3GPP specifications, is widely used to mean a cell other than a CSG cell.

One aspect of HeNB/HNB functionality is the ability to restrict access to particular users. For example, access may be restricted to employees of the company on whose site the HeNB is deployed, to customers of a particular coffee shop chain, or (in the case of HeNBs deployed in private homes) to individuals. To achieve this functionality, 3GPP has defined the concept of the Closed Subscriber Group (CSG). The CSG cell is one which indicates that it is a CSG cell (by means of 1 bit broadcast in the system information) and broadcasts a CSG ID (also in system information). A cell can only indicate one (or none) CSG IDs, however multiple cells may share a CSGID. A UE device may be subscribed to multiple CSGs. The UE may for example may be a mobile terminal such as, but not limited to a cellular telephone, a personal data assistant (PDA), or a wirelessly enabled computer. A subscription may be temporary in nature (e.g., a coffee shop allows a customer one hour's access to its CSG).

3GPP standards are also being developed for the concept of selected IP traffic offloading (SIPTO) which allows interact traffic to flow from the femtocell directly to the internet, bypassing the operator's core network. SIPTO is used to offload selected types of IP traffic (e.g. internet traffic) towards a defined IP network close to the UE's point of attachment to the access network. SIPTO is applicable to traffic offload for the macro-cellular access network and for the femto cell subsystem. SIPTO PDN Connectivity indicates a PDP Context or PDN Connection that allows offload of selected types of IP traffic (e.g. internet traffic) towards a defined IP network close to the UE's point of attachment to the access network. SIPTO is applicable to traffic offload for the macro-cellular access network and for the femto cell subsystem.

In addition, standards are being developed for local IP Access (LIPA) which allows an IP-capable UE connected via a femto cell direct access to other IP-capable devices in the local residential/corporate IP network. LIPA PDN Connectivity indicates a PDP Context (in the case of a GERAN or UTRAN femto cell connected to a GPRS core network) or a PDN Connection (in the case of an E-UTRAN femto cell connected to a GPRS core network) that gives access to services located in the local residential/corporate IP network of the femto cell subsystem.

In connection with these developing standards, the following abbreviations and meanings have been developed.

The Connectivity Type indicates the type of connectivity provided for a packet data protocol (PDP) Context or PDN Connection, and applies to both connectivity established in a macro cell (in which case it can be either remote connectivity—i.e., with a GGSN/PDN GW located in the operator core network—SIPTO connectivity or remote IP access (RIPA) connectivity) and to connectivity established in a H(e)NB (in which case it can be either SIPTO connectivity or LIPA connectivity).

A Closed Subscriber Group (CSG) identifies subscribers of an operator who are permitted to access one or more cells of the PLMN but which have restricted access (CSG cells).

A CSG Cell is a cell that is part of the public land mobile network (PLMN) broadcasting a specific CSG identity, and that is accessible by the members of the closed subscriber group for that CSG identity. All the CSG cells sharing the same identity are identifiable as a single group for the purposes of mobility management and charging. A CSG Cell is considered to be synonymous of HNB and HeNB.

An Allowed CSG List is a list stored in the network and the UE containing all the CSG identity information of the CSGs to which the subscriber belongs.

A CSG Owner is the owner of one or more H(e)NBs that have been configured as a CSG cell(s) for a particular CSG. A CSG owner can, under the H(e)NB operator's supervision, add, remove and view the list of CSG members.

Local IP Access (LIPA) provides access for IP-capable UEs connected via a H(e)NB (i.e. using H(e)NB radio access) to other IP capable entities in the same residential/enterprise IP network. Traffic for Local IP Access is expected to not traverse the mobile operator's network except H(e)NB.

A LIPA PDN Connection/PDP Context is a PDN Connection or PDP Context that gives access to the UE to services located in the local residential/corporate IP network. The PDN GW/GGSN (or Local GW) is selected in such a way to provide this type of connectivity. Alternatively, a LIPA PDN Connection/PDP context is defined as a PDN Connection/PDP context that provides access for IP capable UEs connected via a H(e)NB (i.e. using H(e)NB radio access) to other IP capable entities in the same residential/enterprise IP network. Alternatively, a LIPA PDN connection or LIPA PDP context is a PDN Connection that the MME authorizes for connectivity to a PDN GW for a UE connected to a HeNB based on a request from the UE for LIPA connectivity and based on the CSG ID of the HeNB Alternatively, a UFA PDN connection or LIPA PDP context is a PDN Connection which was activated by the UE requesting LIPA connectivity type "LIPA" and the MME informing the UE of the connectivity type provided.

LIPA PDN Continuity refers to the UE having a LIPA PDN Connection/PDP Context while camping or connected in a H(e)NB that maintains the connection when moving to another H(e)NB or to a macro cell.

An evolved packet core (EPC) functionality (e.g., SGSN, MME, S-GW, PDN GW, GGSN, etc.) is LIPA-aware and/or SIPTO-aware and/or SIPTO-local-aware if the functionality determines that a given PDN connection or PDP context is a LIPA/SIPTO/SIPTO-local PDN connection or PDP context. Alternatively, the functionality is LIPA--aware and/or SIPTO-aware and/or SIPTO-local-aware if it is configured to manage network contexts (e.g. PDN connection/PDP context descriptors and related signaling for LIPA/SIPTO/SIPTO-local connections.

Network address translator (NAT) is a translator that modifies network address information in datagram (IP) packet headers while in transit across a traffic routing device for the purpose of remapping one IP address space into another.

A Packet Data Network (PDN) is a network providing data services, such as the Internet, Intranet and ATM networks.

A PDN Connection is a connection to a specific PDN identified by a specific APN.

Remote Connectivity refers to a PDP Context or PDN Connection for which the GGSN or the PDN GW, respectively, are selected in the PLMN core network according to current selection mechanisms. Remote Connectivity does not include providing SIPTO or LIPA connectivity, but could he providing RIPA connectivity.

Selected IP Traffic Offload (SIPTO) operations offload selected types of IP traffic (e.g., internet traffic) towards an IP network close to the UE's point of attachment to the access network. SIPTO is applicable to traffic offload for the macro-cellular access network and for the H(e)NB subsystem.

SIPTO PDN Connection/PDP Context refers to a PDN Connection/PDP Context for which the breakout point (e.g., PDN GW or GGSN) is close to the UE's point of attachment to the access network.

SIPTO Local refers to the offload of selected types of IP traffic (e.g., internet traffic) at the H(e)NB towards the Internet.

SIPTO Local PDN Connection/PDP Context is a PDN Connection/PDP Context for which the breakout point is the H(e)NB the UE is connected to and provides access to the Internet, Home Node B (HNB) refers to customer-premises equipment that connects a 3GPP UE over UTRAN wireless air interface to a mobile operator's network, e.g., using broadband IP backhaul.

Home Evolved Node B (HeNB) refers to a customer-premises equipment that connects a 3GPP UE over E-UTRAN wireless air interface to a mobile operator's network, e.g., using broadband IP backhaul.

A H(e)NB Gateway is a mobile network operator's equipment (usually physically located on mobile operator premises) through which the H(e)NB gets access to mobile operator's core network. For HeNBs, the HeNB Gateway is optional.

A Default PDN Connection is the connection to the PDN that the operator has set as default for the UE (for a PDP Connection in EPS or a PDP Context in GPRS) (provisioned in the subscriber profile). The UE may not know the APN for the Default PDN even after the UE attaches to the network and obtains connectivity to the default PDN.

The network architecture model for the support of CSG Cells is described in 3GPP TR 23.830 (Architecture aspects of Home NodeB and Home eNodeB) and depicted with reference to FIG. 1 which shows an architecture model for a Home NodeB access network 100. As depicted, the network 100 includes one or more CSG-capable UEs 170 in communication with a HNB 110 over reference point Uu 175. The UEs 170 may, for example, be a mobile terminal such as, but not limited to, a cellular telephone, a personal data assistant (PDA), or a wirelessly enabled computer. The HNB 110 is in communication with a HNB gateway (HNB GW) 120 over reference point IuH 115. The HNB GW 120 is in communication with mobile switching center/visitor location center (MSC/VLR) 130 over reference point Iu-CS 124. The HNB GW 120 is also in communication with serving GPRS Support Node (SGSN) 140 over reference point Iu-PS 126. A CSG List Server (CSG List Srv) 150 and home location register/home subscriber server (HLR/HSS) 160 are part of a home public land mobile network (HPLMN) 190. Networks that are not the HPLMN 190 on which the UE may operate are a visited public land mobile network (VPLMN) 180. The MSC/VLR 130 and the SGSN 140 are each in communication with the HLR/HSS 160 over reference points D 135 and GRs6d 145, respectively. One of the CSG enabled UEs 170 is in communication with the CSG List Srv 150 over reference point C1 185. A more detailed description of the elements and communication reference points of FIG. 1 are provided herinbelow.

HNB 110: The HNB 110 provides the RAN connectivity using the Iuh 115 interface, supports the NodeB and most of the radio network controller (RNC) functions and also HNB authentication, HNB-GW discovery, HNB registration UE registration over Iuh 115. The HNB 110 secures the communication to/from the SeGW.

HNB GW 120: The HNB GW 120 serves the purpose of a RNC presenting itself to the core network (CN) as a concentrator of HNB connections, i.e. the HNB GW 120 provides concentration function for the control plane and provides concentration function for the user plane. The HNB GW 120 supports Non Access Stratum (NAS) Node Selection Function (NNSF).

Uu 175: Standard Uu interface between the UE 170 and the HNB 110.

Iuh 115: Interface between the HNB 110 and HNB GW 120. For the control plane, Iuh 115 uses HNBAP protocol to support HNB registration, UE registration and error handling functions. For the user plane, Iuh support user plane transport bearer handling.

Iu-CS 124: Standard Iu-CS interface between the HNB GW 120 and the packet switched (PS) core network.

Iu-PS 126: Standard Iu-PS interface between the HNB GW 120 and the packet switched (PS) core network.

D 135: Standard D interface between mobile switching center/visitor location center (MSC/VLR) 130 and home location register/home subscriber server (HLR/HSS) 160.

Gr/S6d 145: Standard Gr interface between serving GPRS Support Node (SGSN) 140 and HLR/HSS 160.

C1 185: Optional interface between the CSG List Server (CSG List Srv) 150 and CSG-capable UEs 170. Over-the-air (OTA) signaling is used to update the allowed CSG list on a UE 170 with a Release 8 (Rel-8) Universal Subscriber Identity Module (USIM). In some embodiments, Open Mobile Alliance (OMA) Device Management (DM) is used to update the Allowed CSG list on the UE 170 with a pre-Rel-8 USIM.

UEs that are capable of supporting Rel-8 functionality of the 3GPP standard may support CSG functionality and maintain a list of allowed CSG identities. This list can be empty in case the UE does not belong to any CSG.

Each cell of a HeNB may belong to, at maximum, one CSG. It is possible for cells of a HeNB to belong to different CSGs and hence have different CSG IDs.

The Allowed CSG List is provided as part of the CSG subscriber's subscription data to the MME.

The Allowed CSG List can be updated in the UE according to the result of the attach procedure, the Tracking Area Update (TAU) procedure, service request and detach procedures or by application level mechanisms such as OMA DM procedures.

The MME performs access control for the UEs accessing through CSG cells during attach, combined attach, detach, service request and TAU procedures.

The UE is notified of the cause of rejection by the network if the UE is not allowed to access a CSG cell.

When a CSG ID which is not included in the UE's Allowed CSG List is manually selected by the user, a TAU procedure via the selected CSG cell my be triggered immediately by the UE to allow MME to perform CSG access control.

There is no restriction on Tracking Area identity (TAT) assignment for E-UTRAN CSG cells. As a result, it is possible that a normal cell (non-CSG cell) and a CSG cell can share the same TAI or have different TAIs. In addition, it is possible that CSG cells with different CSG ID can share the same TAI or have different TAIs. It is also possible that CSG cells with the same CSG ID can share the same TAI or have different TAIs.

The concept of TAI list applies also for CSG cells. The TAI list may include TAIs related to CSG cells and TAIs related to non-CSG cells. The UE does not differentiate these TAIs in the TAI list.

For the case of HeNB GW deployment, TAIs supported in the HeNB GW are the aggregation of TAIs supported by the CSG cells under this HeNB GW.

Several architectures for HeNB CSG Cells will now be described with reference to FIGS. 2-4. Starting with FIG. 2, there is depicted an architecture model for a HeNB access network 200 which includes a dedicated HeNB GW. In the depicted network 200, a single UE 270 is in communication with a HeNB 210 over reference point LTE-Uu 275. The HeNB 210 is also in communication with a HeNB gateway (HeNB GW) 220 over reference point S1 215. The HeNB GW 220 is in communication with mobility management entity (MME) 230 over reference point S1-MME 224, and is also in communication with serving gateway (S-GW) 240 over reference point S1-U 226. A CSG List Server (CSG List Srv) 250 and home subscriber server (HSS) 260 are part of a home public land mobile network (HPLMN) 290. Networks that are not the HPLMN 290 on which the UE may operate are a visited public land mobile network (VPLMN) 280. The MME 230 is in communication with the HSS 260 over reference point S6a 235. The S-GW 240 is in communication with the MME 230 over reference point S11 245. The UE 270 is in communication with the CSG List Srv 250 over reference point C1 285. A more detailed description of the elements and communication reference points of FIG. 2 are provided below.

HeNB 210: The functions supported by the HeNB 210 may be the same as those supported by an eNB (with the possible exception of Non Access stratum (NAS) node selection function (NNSF)) and the procedures run between a HeNB and the evolved packet core (EPC) may be the same as those between an eNB and the EPC. The HeNB 210 secures the communication to/from the SeGW 240.

HeNB GW 220: HeNB GW 220 serves as a concentrator for the control plane (C-Plane), specifically the S1-MME interface 224. The HeNB GW may optionally terminate the user plane towards the HeNB 210 and towards the S-GW 240, and provide a relay function for relaying User Plane data between the HeNB 210 and the S-GW 240. In some embodiments, the HeNB GW 220 supports NNSF.

S-GW 240: The Security Gateway 240 is a logical function that may be implemented either as a separate physical entity or co-located with an existing entity. The S-GW 240 secures the communication from/to the HeNB 210.

LTE-Uu 275: Standard LTE-Uu interface between the 270 and the HeNB 210.

S1-MME 224: The S1-MME 224 interface is defined between HeNB 210 and MME 230 if no HeNB GW 220 is used. If HeNB GW 220 is present, as in FIG. 2, the HeNB GW 220 may use an S1-MME interface towards both HeNB (S1 215) and MME (S1-MME 224).

S1 43 226: The S1-U data plane is defined between the HeNB 210, HeNB GW 220 and the Serving Gateway (S-GW) 240, depending upon the arrangement of network elements. The S1-U 226 interface from the HeNB 210 may be terminated at the HeNB GW 220, or a direct logical U-Plane connection between HeNB and S-GW may be used.

S11 245: Standard interface between MME 230 and S-GW 240.

S6a 235: Standard interface between MME 230 and HSS 260.

C1 285: Optional interface between the CSG List Srv 250 and CSG-capable UEs 270. OTA is used to update the allowed CSG list on a UE 270 with a Rel-8 USIM. OMA DM is used to update the Allowed CSG list on a UE with a pre-Rel-8 USIM.

With reference to FIG. 3, there is depicted an architecture model for a HeNB access network 300 which does not include a dedicated HeNB GW. In the depicted network 300, a single UE 370 is in communication with a HeNB 310 over reference point LTE-Uu 375. The HeNB 310 is in communication with a S-GW 340 over reference point S1-U 326, and is also in communication with MME 330 over reference point S1-MME 324. A CSG List Srv 350 and HSS 360 are part of a HPLMN 390. Networks that are not the HPLMN 390 on which the UE may operate are a VPLMN 380. The MME 330 is in communication with the HSS 360 over reference point S6a 335. The S-GW 340 is in communication with the MME 330 over reference point S11 345. The UE 370 is in communication with the CSG List Srv 350 over reference point C1 385.

With reference to FIG. 4, there is depicted an architecture model for a HeNB access network 400 which includes a HeNB GW for the C-Plane. In the depicted network 400, a single UE 470 is in communication with a HeNB 410 over reference point LTE-Uu 475. The HeNB 410 is in communication with a S-GW 440 over reference point S1-U 426, and is also in communication with a HeNB-GW 420 over reference point S1-MME 422. The HeNB-GW 420 is in communication with MME 430 over reference point S1-MME 424. A CSG List Srv 450 and HSS 460 are part of a HPLMN 490. Networks that are not the HPLMN 490 on which the UE may operate are a VPLMN 480. The MME 430 is in communication with the HSS 460 over reference point S6a 435. The S-GW 440 is in communication with the MME 430 over reference point S11 445. The UE 470 is in communication with the CSG List Srv 450 over reference point C1 485.

Traditionally, the UE connects to services through a remote connection using a PDP Context towards a GGSN in the core network in the case of 2G/3G, and a PDN Connection to a PGW in the Evolved packet system (EPS). As will be appreciated, PDN connection procedures are described in 3GPP TS 23.401 ("General Packet Radio Service (GPRS) enhancements for Evolved Universal Terrestrial Radio Access Network (E-UTPAN) access") and 3GPP TS 24.301 ("Non-Access-Stratum (NAS) protocol for Evolved Packet System (EPS)"). Additional signal flow information relating to PDN connectivity setup and handover procedures is described in U.S. patent application Ser. No. 12/685651 (filed Jan. 11, 2010) and U.S. patent application Ser. No. 12/685662 (filed Jan. 11, 2010) which are each incorporated herein by reference as is fully set forth herein.

As explained above, 3GPP is introducing the concepts of local IP access (LIPA) and selective IP traffic offloading (SIPTO) to supplement the traditional way for connecting a UE to services through a remote connection (PDP Context towards a GGSN in the core network in the case of 2G/3G, and a PDN Connection to a PGW in the Evolved packet system (EPS). With LIPA and SIPTO connections, the UE is connected to a HNB/HeNB located in a home or corporate environment to obtain local connectivity, i.e. connectivity through the IP network local to the HNB (i.e. the (residential or enterprise) IP network in the HNB "home" premises). An example of this scenario is when a given application in the UE needs to print on a local printer, or an application needs to download an updated music playlist from a local media server. Several architectures for providing LIPA and SIPTO connections over HNB/HeNB cells will now be described with reference to FIGS. 5 and 6, where the difference between LIPA connectivity and normal connectivity is also highlighted.

With reference to FIG. 5, there is illustrated a schematic diagram of an example logical architecture network 1000 for use in a HNB cell illustrating Local IP connectivity. The depicted network 1000 is substantially the same as FIG. 1 with the addition of a Gateway GPRS Support Node (GGSN) 196 connected to the SGSN 140, a PDN 198 connected to the GGSN 196, and a home network 104 that has an illustrated coverage area defined by the circle shape. LIPA PDN connectivity is illustrated from the UE 170 through the HNB 110 to the local service 106 via dotted line 108. Normal PDN connectivity via the core network (HNB GW 120, SGSN 140 and GGSN 196) is illustrated from the UE 170 to the PDN 198 via dashed line 105.

In the HNB scenarios, a UE 170 determines whether it has access to a given HNB 110 thanks to the UE 170 having knowledge of its belonging to a specific Closed Subscriber Group (CSG). The operator/owner of an HNB 110 creates list of CSGs and provisions the UEs 170, 172 with CSG lists so that the UE 170, 172 determines which HNBs it can connect to. Therefore, a UE 170, 172 that is moving in macro-coverage (i.e. in cellular cells not belonging to a CSG/HNB) may conic across a CSG/HNB cell 104. The UE 170, 172 would use the CSG information to decide whether to attempt connection to such HNB 110 or not. CSG information is typically configured in the UE 170, 172 by the operator and can dynamically be modified, e.g. using OMA-DM (Device Management). USIM information to support LIPA is also foreseen. Some of this information may be managed by the H(e)NB hosting party too.

With reference to FIG. 6, there is illustrated a schematic diagram of the example logical architecture network 1100 for use in a HeNB cell illustrating Local IP connectivity. The depicted network 1100 is substantially the same as FIG. 2 with the addition of a PGW 296 connected to the S-GW 240, a PDN 298 connected to the PGW 296, and a home network 204 that has an illustrated coverage area defined by a circle shape. LIPA PDN connectivity is illustrated from the UE 270 through the HeNB 210 to the local service 206 via dotted line 208. Normal PDN connectivity via the core network (HeBN 210, HeNB GW 220, S-GW 240 and PGW 296) is illustrated from the UE 270 to the PDN 298 via dashed line 205. In the HeNB scenarios, a UE 270 also determines its access rights to the HeNB network 204 using the CSG list provided by the HeNB 210.

As will be appreciated, the relevant 3GPP specifications in this area include 3GPP TR 23.829 entitled "Local IP Access & Selected IP Traffic Offload" (which describes the mechanisms for IP traffic offloading) and 3GPP S2-096006 entitled "Terminology update to agreed text in TR 23.8xy" (which introduced LIPA and SIPTO functionalities and architectural aspects). In addition, 3GPP S2-096050 entitled "LIPA and SIPTO node functions" and 3GPP S2-096013 entitled "Internet offload for macro network" set forth the architectural principles for selected embodiments of the disclosure relating to Local IP Access and Selected IP Traffic Offload based on traffic breakout performed within H(e)NB using a local PDN connection, as well as Local IP Access and Selected IP Traffic Offload at H(e)NB by NAT. 3GPP S2-095900 entitled "Architectural Requirements of Internet Offload" introduced the architectural requirement that traffic offload can be performed without user interaction, and that the impact on the existing network entities and procedures by introducing traffic offload be minimized.

In addition to the foregoing, 3GPP S2-096013 entitled "Internet offload for macro network" introduced an additional SIPTO solution which supports SIPTO for UNITS macros and for HNB subsystems. The additional SIPTO solution is depicted in the schematic diagram of FIG. 7 which shows an example logical architecture showing a Traffic Offload Function (TOF) 1208 deployed at Iu-PS. In the depicted architecture, the TOF 1208 is located at Iu-PS and provides standard Iu-PS interface to the RNC 1206 and the SGSN 1210. Selected IP Traffic Offload is enabled by NAT and SPI/DPI based on operator policies at different levels (e.g. per user, per APN, per service type, per IP address, etc). The policies may be configured via e.g. OAM. One PDN connection or PDP context for both offload traffic and non-offload traffic is supported, while also allowing use of different PDN connections or PDP contexts for offload traffic and non-offload traffic (e.g. by selecting the traffic based on APN). The TOF 1208 includes a number of functions. First, the TOF 1208 inspects both NAS and RANAP messages to get subscriber information and establish local UE context. The TOF 1208 also decides the offload policy to be applied based on above information (e.g., during attach and PDP context activation procedures). In addition, TOF 1208 drags the uplink traffic out from the GTP-U tunnel and performs NAT to offload the traffic if offload policy is matched. TOF 1208 may also perform reverse NAT to the received downlink offload traffic and inserts it back to the right GTP-U tunnel.

A local gateway-based architecture solution is also introduced at 3GPP S2-096015 entitled "Local GW Based Architecture" which supports Local IP Access for H(e)NB subsystem, Selected IP Traffic Offload for H(e)NB subsystem, and Selected IP Traffic Offload for macro network. The solution applies to both types of approaches: with separate APNs for SIPTO and non-SIPTO traffic, and also with common APN(s) for SIPTO and non-SIPTO traffic. The local gateway solution is depicted in the schematic diagram of FIG. 8 which shows an example logical architecture for a proposed extension of non-roaming architecture for 3GPP accesses for SIPTO and LIPA. In the depicted architecture, a Local Gateway (L-GW) 1306 is co-located with the (H)eNB 1304. Between L-GW 1306 and PDN GW 1310, a Local-GW Extension Tunnel 1326 is configured. The L-GW 1306 performs gateway and routing to/from external PDN (e.g. interact, enterprise or home NW) that is equivalent to SGi. In addition, the L-GW 1306 performs tunneling of IP packets through the extension tunnel 1326 to/from PDN GW 1310 (e.g., based on GTP, PMIP, IP in IP or other). The L-GW 1306 also performs IP address handling (either IP address allocation and conveyance to PDN GW, or alternatively reception of IP address from PDN GW and NATing), as well as coordination with the (H)eNB 1304 on usage of local breakout (trigger eNB for local traffic handling). The L-GW 1306 also implements a decision function on the usage of local breakout for uplink traffic (optionally it can be part of the eNB). As will be appreciated, the L-GW 1306 is not a PDN GW shifted to eNB/E-UTRAN, but encompasses only minimal functionality.

With the L-GW 1306, the functionality of the PDN GW 1310 is enhanced by establishing the extension tunnel 1326 upon PDN connection establishment for APNs matching the criteria for local traffic. In addition, the PDN GW 1310 forwards traffic through extension tunnel 1326 and to/from S5/S8 tunnel, and performs IP address handling (either obtain of IP address from L-GW, or alternatively conveyance to L-GW).

At the (H)eNB 1304, there is provided UE access state information for the cell(s) served by the (H)eNB 1304 to the L-GW 1306. In addition, the (H)eNB 1304 implements a decision function on usage of local breakout for uplink traffic (based on APN). With the enhanced architecture shown in FIG. 8, mobility between 3GPP and non-3GPP accesses can be managed since the PDN GW 1310 is always in the path when the UE 1302 leaves the (H)eNB 1304, meaning that the mobility support function of handover towards non-3GPP accesses can be handled by the PDN GW 1310 as usual. As a result, such functionality does not need to be provided as part of the L-GW 1305 or within the (H)eNB 1304. In addition, it is possible to achieve dynamic control for LIPA/SIPTO handling in the PDN-GW 1310 which is switched on only after the extension tunnel 1326 is set up.

Accordingly, a need exists for improved method, system and device for managing LIPA connection releases to overcome the problems in the art, such as outlined above. Further limitations and disadvantages of conventional processes and technologies will become apparent to one of skill in the art after reviewing the remainder of the present application with reference to the drawings and detailed description which follow.

BRIEF DESCRIPTION OF THE DRAWINGS

The present disclosure may be understood, and its numerous objects, features and advantages obtained, when the following detailed description is considered in conjunction with the following drawings, in which.

DETAILED DESCRIPTION

Figure 1:
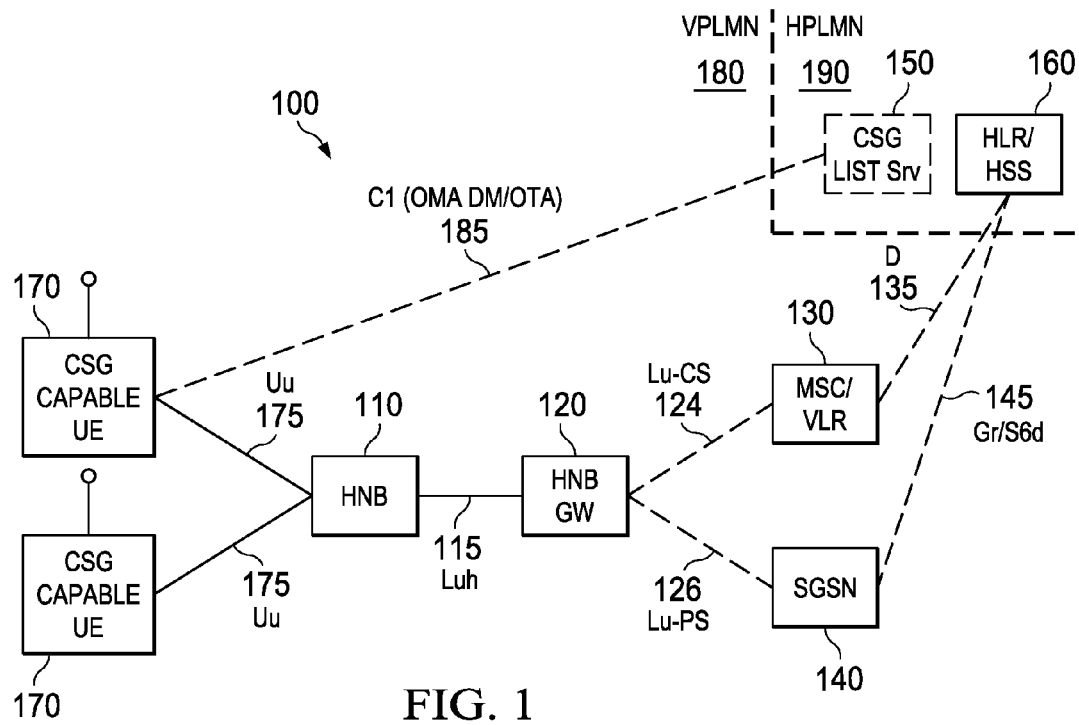
FIG. 1 is a schematic diagram of an example logical architecture for use in a HNB cell.
Figure 2:
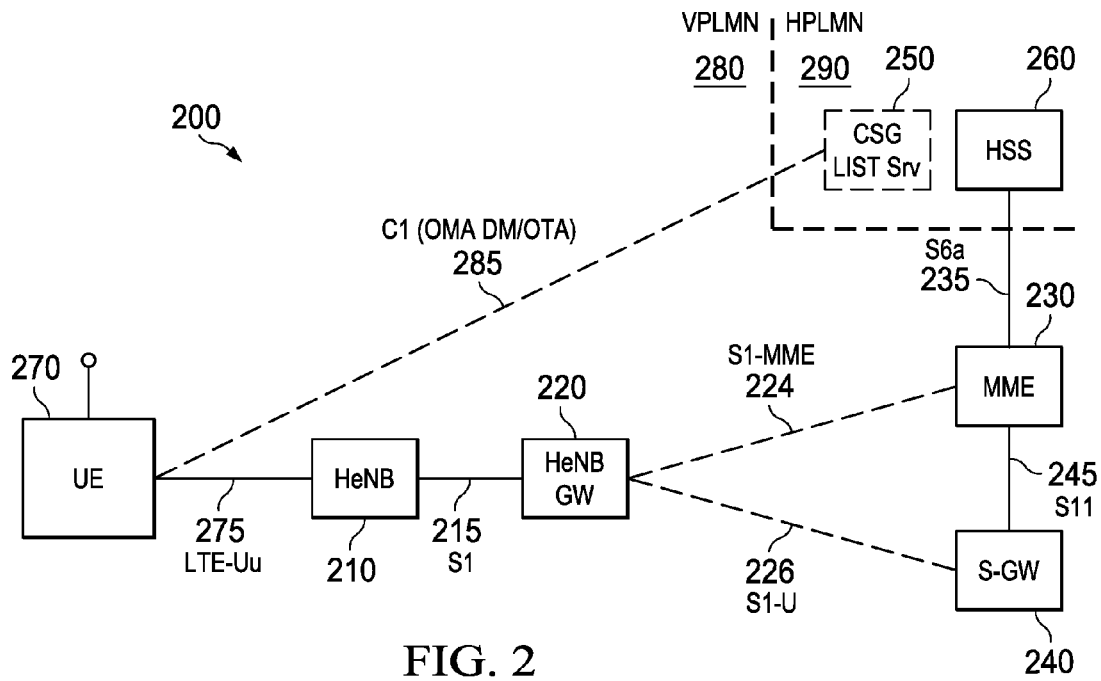
FIG. 2 is a schematic diagram of an example logical architecture for use in a HeNB cell in which the network includes a dedicated HeNB GW.
Figure 3:
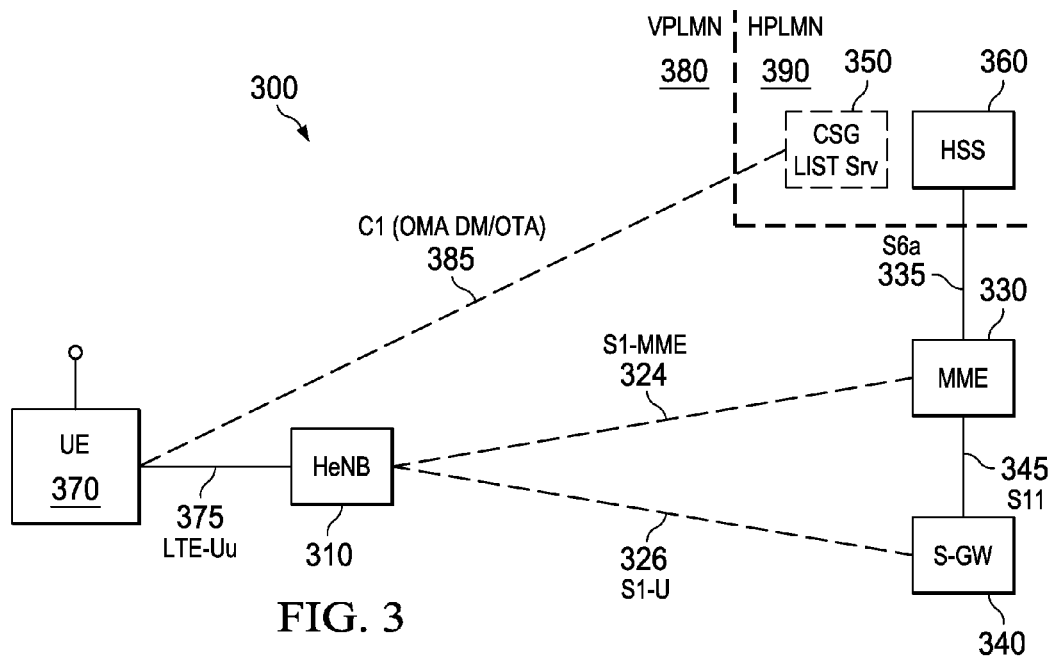
FIG. 3 is a schematic diagram of another example logical architecture for use in a HeNB cell in which the network does not include a dedicated HeNB GW.
Figure 4:
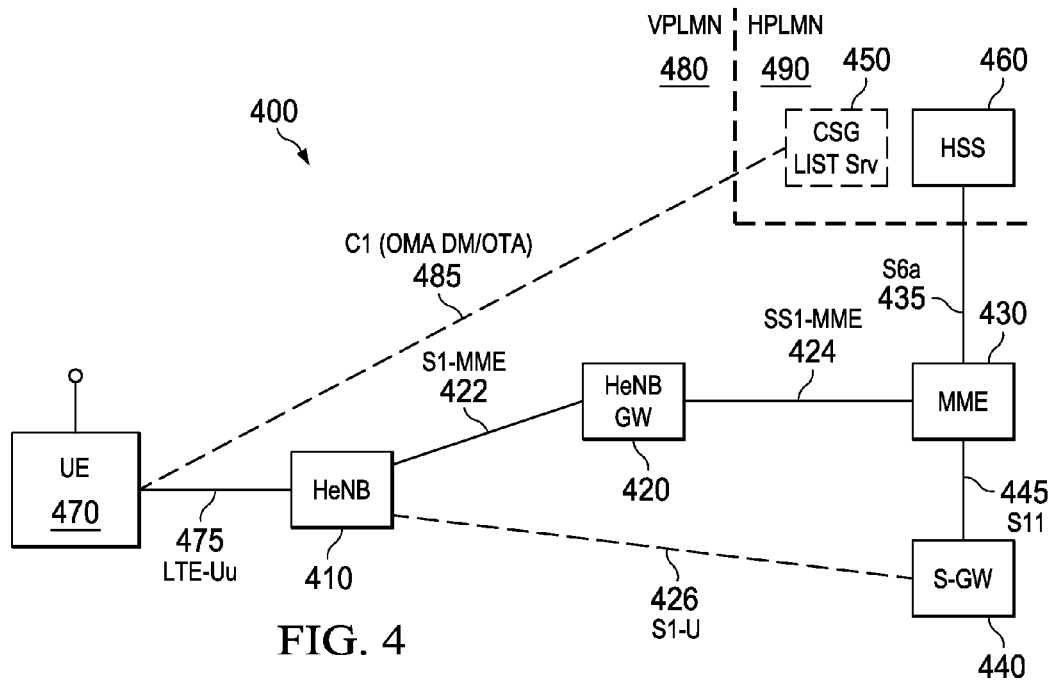
FIG. 4 is a schematic diagram of a further example logical architecture for use in a HeNB cell in which the network includes a HeNB GW for the C-Plane.
Figure 5:
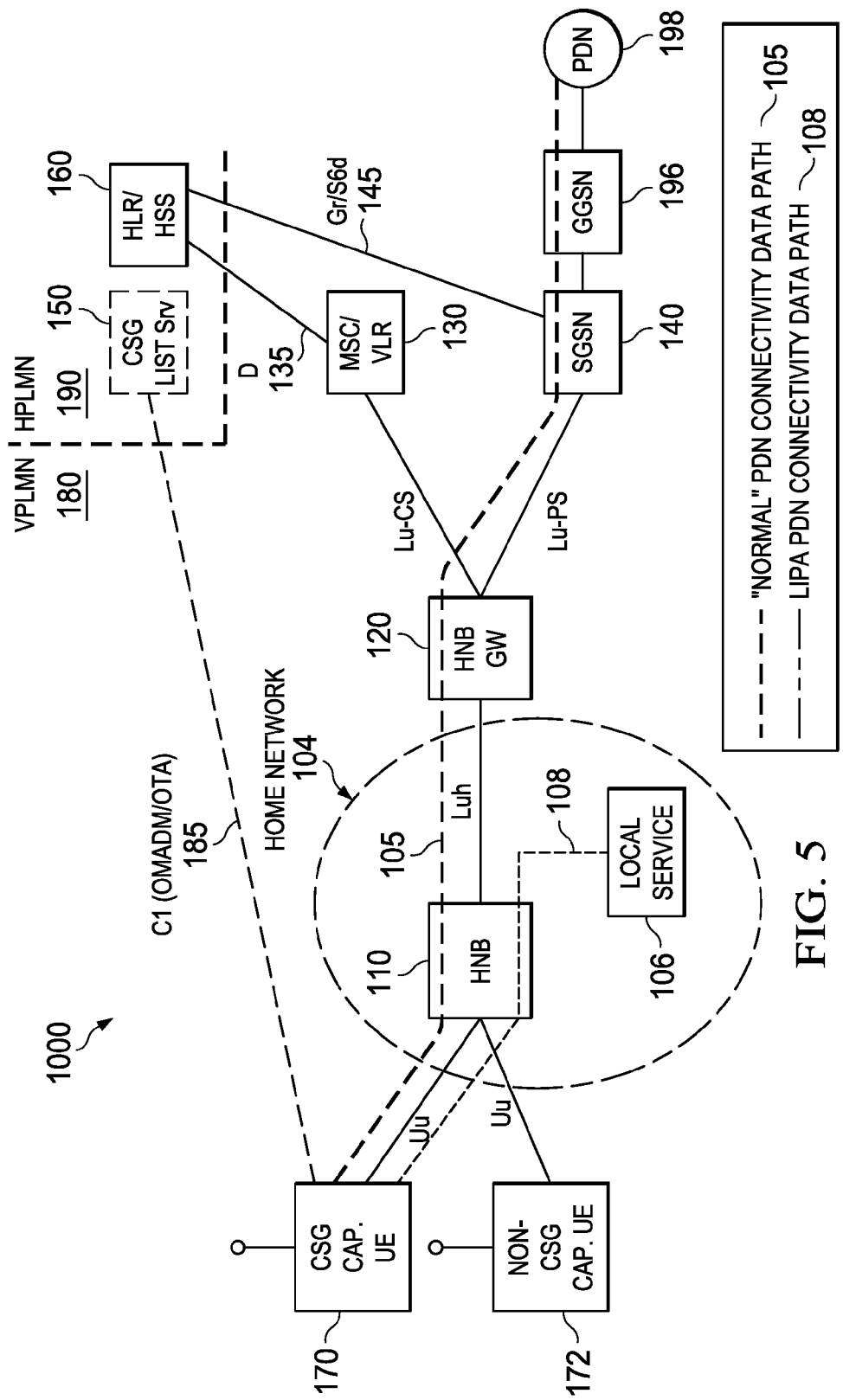
FIG. 5 is a schematic diagram of an example logical architecture for use in a HNB cell illustrating Local IP connectivity.

A method, system and device are provided for managing LIPA and/or SIPTO connection releases when UE moves out of residential/enterprise network coverage in case service continuity is not supported for the LIPA/SIPTO PDN connection(s). In selected embodiments where a UE has only one PDN connection which is LIPA PDN connection, automatically releasing it when the UE leaves the residential/enterprise network coverage will cause the UE to be detached from the network as the UE does not have a PDN connection. To address problems caused by not providing service continuity for LIPA/SIPTO PDN connection(s), the PDN connection/PDP context created in the HeNB/HNB by the MME/SGSN includes context information related to the UE indicating whether such connection is a LIPA PDN connection PDN connection or not. In addition, each UE may be configured to reconnect (or not reconnect) to the PDN corresponding to a certain APN or service if the PDN connection was disconnected by the network due to mobility from a H(e)NB (where the UE was connected in LIPA to such PDN) to a target cell (Where LIPA continuity is not provided). In selected embodiments, the UE can be configured to contain (1) an indication of whether any PDN that was disconnected due to lack of LIPA service continuity needs to be reconnected, (2) a list of APNs for which the PDN needs to be reconnected if the PDN that was disconnected due to lack of LIPA service continuity, (3) an indication of availability of LIPA service continuity, (4) a list of indicators for PDN connection with certain characteristics, (5) an indication of whether disconnecting non-LIPA is allowed if emergency call with insufficient credentials is not allowed, and/or (6) an indication of whether a UE retains at least two PDN connections with one of the PDN connections being to either a particular APN or to a default APN.

Various illustrative embodiments of the present disclosure will now be described in detail with reference to the accompanying figures. While various details are set forth in the following description, it will be appreciated that the present disclosure may be practiced without these specific details, and that numerous implementation-specific decisions may be made to the disclosure described herein to achieve the device designer's specific goals, such as compliance with process technology or design-related constraints, which will vary from one implementation to another. While such a development effort might be complex and time-consuming, it would nevertheless be a routine undertaking for those of ordinary skill in the art having the benefit of this disclosure. For example, selected aspects are shown in block diagram and flow chart form, rather than in detail, in order to avoid limiting or obscuring the present disclosure. In addition, some portions of the detailed descriptions provided herein are presented in terms of algorithms or operations on data within a computer memory. Such descriptions and representations are used by those skilled in the art to describe and convey the substance of their work to others skilled in the art. Various illustrative embodiments of the present disclosure will now be described in detail below with reference to the figures.

Ongoing 3GPP discussions have addressed the treatment of LIPA/SIPTO PDN connection releases associated with UE mobility. In these discussions, there is currently a preference to not provide service continuity for a LIPA PDN connection if the UE moves out of the coverage of the residential/enterprise network, and instead to release the LIPA PDN connection. This preference for releasing connections is based on a number of factors. First, there is a concern that lawful Interception will be applied to local IP resource access if the UE resides in macro (e)NB's coverage and service continuity is maintained. Also, it will be difficult to establish charging schemes which change as the UE moves from H(e)NB to macro (e)NB. There may also be authentication complications involved with maintaining service continuity. Based on these discussions, Release 10 of 3GPP S1-100316 entitled "Mobility for Local IP Access (LIPA)" and of 3GPP S1-100321 entitled "SIPTO requirements common for macro network and H(e)NB subsystems" specifies that mobility of a LIPA connection to macro network is not supported, whereas mobility of the LIPA connection between H(e)NBs in the same residential/enterprise network is supported/required. In addition, Release 10 of 3GPP S1-100321 entitled "SIPTO requirements common for macro network and H(e)NB subsystems" specifies that mobility of a SIPTO connection within the macro network shall be supported, and mobility from H(e)NB to macro and between H(e)NB may be supported.

In view of the preference against maintaining service continuity for LIPA connections when the UE leaves the residential/enterprise network coverage, there are a number of different problems created resulting in unwanted UE disconnections. As explained more fully below, these release problems have multiple dimensions, including problems with PS services when there is UE mobility in connected mode, problems triggered by CSFB procedures when there is UE mobility in connected mode, and problems with or without ISR when there is UE mobility in idle mode. In discussing these problems, consideration should be given to LIPA mechanisms which also work for pre-Release 10 UEs (i.e., UEs that are not aware of LIPA connectivity, such as occurs when the network provides LIPA connectivity to the UE based on subscription profile or network decision, without the UE being aware of such decision). For such UEs, NAS signaling and mechanism cannot be modified in order to resolve the identified problems.

Figure 9:
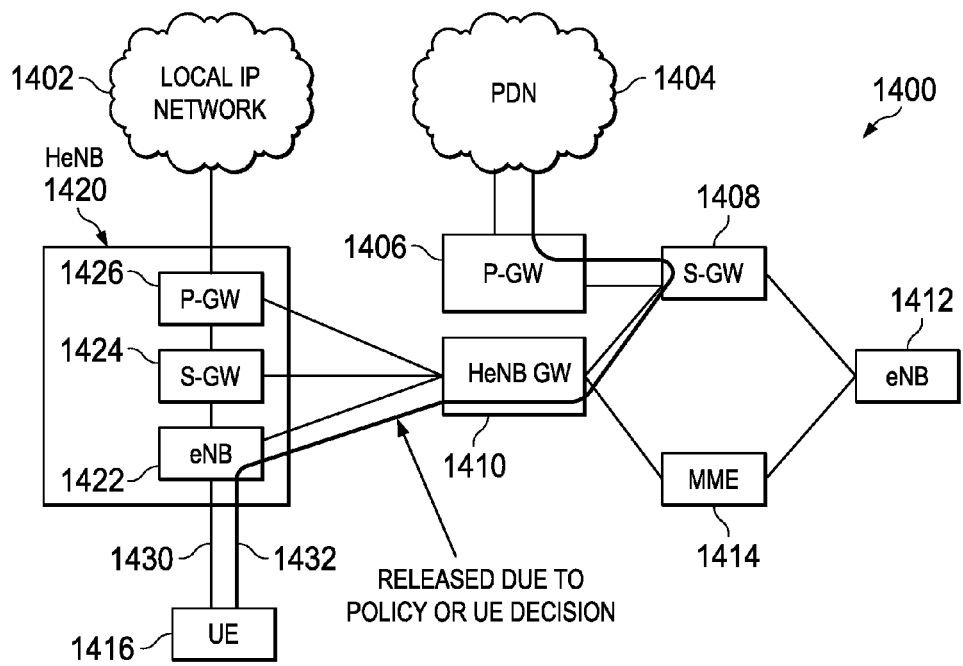
FIG. 9 is a schematic diagram of traffic flows in an HeNB subsystem in which the UE has at least a LIPA PDN connection.
Figure 10:
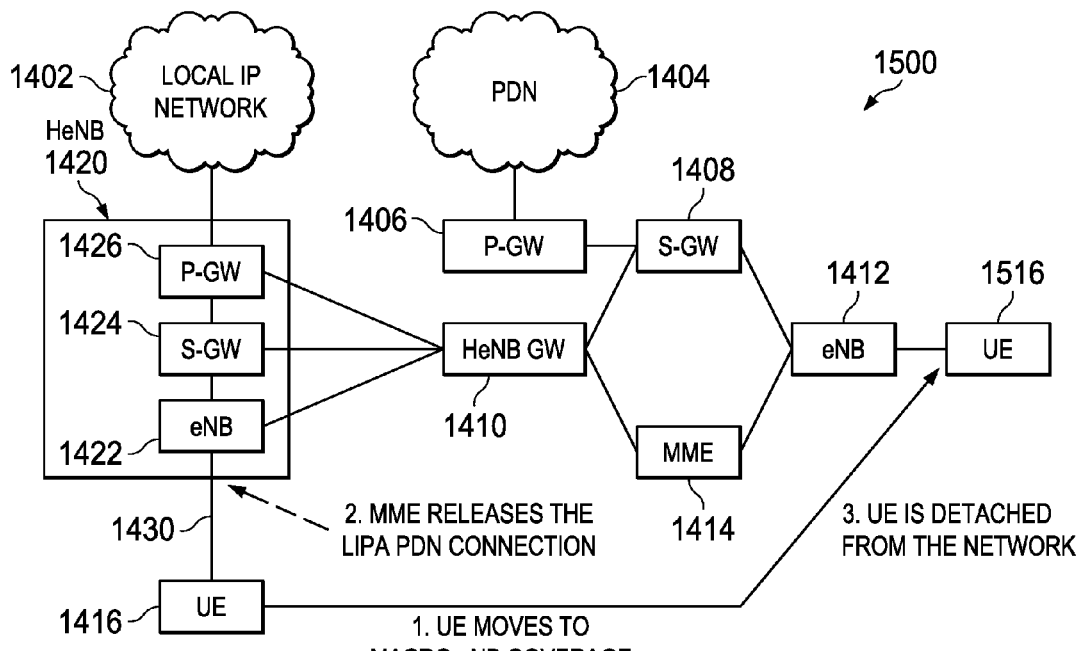
FIG. 10 is a schematic diagram of traffic flows in an HeNB subsystem in which the UE moves outside of HeBN coverage.

For purposes of illustrating the UE disconnect problem, reference is now made to FIGS. 9-10 which schematically illustrate the release of a LIPA PDN connection as the UE moves outside the HeNb enterprise network coverage, where the term "PDN connection" refers both to a PDN Connection involving a HeNB and a PDP Context involving a HNB unless explicitly indicated. In particular, FIG. 9 is a schematic diagram of traffic flows in an HeNB subsystem 1400 in which the UE 1416 has a LIPA/SIPTO PDN connection 1430 and a core network (CN) PDN connection 1432. With the LIPA/SIPTO PDN connection 1430 established, user plane traffic for LIPA and SIPTO does not go through the core network connection 1432. Instead, the traffic goes from UE 1416 through the Local eNB 1422, Local S-GW 1424, and Local P-GW 1426, which are illustrated to all be collocated in HeNB 1420, as indicated with line 1430. If the UE 1416 has an additional, non-LIPA, non-SIPTO PDN connection, the traffic goes through the HeNB-GW 1410, S-GW 1408, and P-GW 1406 to the core PDN 1404 as indicated with line 1432. Since the second PDN connection 1432 can be released at any time (e.g., due to pre-defined policy or UE configuration), there are times when the UE 1416 has only one PDN connection when connected to the H(e)NB 1420, and such PDN connection is a LIPA PDN connection 1430.

To illustrate the UE disconnect problem, reference is now made to FIG. 10 which depicts a schematic diagram of traffic flows in an HeNB subsystem 1500 in which the UE 1416 moves outside of HeBN coverage when it has only a LIPA PDN connection. In this case, the reference to moving "outside the H(e)NB" indicates both case of the UE moving from a H(e)NB cell to macro cell coverage, and the case of the UE moving between H(e)NB cells for which LIPA PDN continuity is not supported (e.g. H(e)NBs with different CSGs). It may be that LIPA PDN continuity is not supported between any H(e)NB cell. Thus, FIG. 10 illustrates that the UE 1416 moves towards a second position 1516 where there is macro coverage, though the UE 1416 could also move to another H(e)NB for which LIPA PDN continuity is not supported. As soon as the MME 1414 detects that the UE is not connected to the H(e)NB 1420 (e.g. the UE has moved to a different cell where LIPA continuity is not supported), the MME 1414 releases the LIPA PDN connection 1430 since there is no requirement of maintaining LIPA PDN connectivity. As a result, there is no PDN connection for the UE 1516. As described more fully below, the MME 1414 can detect that the UE 1516 is out of coverage of the H(e)NB 1420 based on a variety of detection mechanisms, such as when the UE 1516 performs a Tracking Area Update (TAU) or Routing Area Update (RAU) from a different cell, or when the UE 1516 responds to paging from a different cell, etc.

In E-UTRAN, a UE has to maintain at least one PDN connection for the UE to be considered attached to the network. If there is no PDN connection, the UE is detached from the network. FIG. 10 shows how the disconnect problem arises when a UE 1416 has only a single, active LIPA PDN connection 1430, and the MME 1414 releases the LIPA PDN connection 1430 upon detecting that the UE 1416 has moved to a new position which is not connected to the H(e)NB 1420 anymore. When detachment occurs, the UE 1516 may not know why it is being detached and why the LIPA PDN connection 1430 is being released, and is then forced to re-attach to the network. This issue applies both for NAS idle mode mobility and NAS connected mode mobility. As will be appreciated, while the foregoing discussion refers to LIPA PDN connections, the same challenges apply to a LIPA PDP Context (in case of HNB) or the SIPTO Local connectivity, unless explicitly indicated. And though not explicitly shown, it will also be appreciated that similar problems arise when UE mobility is from the H(e)NB 1420 towards GERAN/UTRAN (i.e. involving a SGSN), in which case the active PDP context (corresponding to the LIPA connection) needs to be deactivated, even if the UE does not need to be detached.

In this framework, a number of problem cases associated with LIPA connection releases are identified and discussed in relation to FIG. 10 more fully below. In addition, solutions for managing the various connection release problems are identified and discussed as set forth below.

Mobility In Connected Mode There a number of problem cases that arise in the case of an active handover where the UE has NAS connected mode mobility.

In an example problem case, a connected mode UE 1416 has a LIPA PDN connection or SIPTO connectivity/SIPTO PDN connection 1430. As the connected mode UE 1416 moves out of the HeNB coverage 1420 (which is directly connected to the residential/enterprise network 1402) to a second position 1516 at a target E-UTRAN cell (e.g., eNB cell 1412 or another HeNB cell for which LIPA continuity is not supported), the source HeNB 1420 makes a decision to handover (HO) the UE to the target cell 1412 based on the measurement reports from the UE 1516. The HeNB 1420 sends a HO REQUIRED message to the MME 1414. As the HO REQUIRED message contains a Target ID, the MME 1414 determines that LIPA/SIPTO service shall not be continued at the target cell 1412 (e.g. based on the fact that the target cell is a macro cell or a H(e)NB in a different CSG). Based on this determination, the MME 1414 releases the LIPA/SIPTO PDN connection 1430, but the existing specifications do not specify how the MME 1414 handles the LIPA/SIPTO PDN connection release.

In another problem case, a connected mode UE 1416 is handed over from HeNB 1420 to a GERAN/UTRAN cell (not shown) for which LIPA PDN continuity shall not be supported. An example would occur when a UE 1416 having only a LIPA PDN connection 1430 performs an IRAT HO towards GERAN/UTRAN where LIPA continuity is not supported. In this case, the UE may become detached from the network or without PDP contexts if the LIPA PDN connection is released, but the existing specifications do not specify how to handle the IRAT HO. Also, if the UE 1416 has other PDN connections in addition to the LIPA PDN connection 1430 in the source cell, the LIPA PDN connection 1430 needs to be disconnected during this IRAT HO. The context information between network (SGSN) and UE containing information on the active PDN connections/PDP contexts might be out of synch for a while until a new RAU is performed by the UE and the context is synchronized between the UE and the SGSN. In cases where the context is out of synch, the UE incorrectly considers the PDP context corresponding to the LIPA connection still active.

In another problem case, a connected mode UE 1416 moves from HNB cell or coverage (not shown) to a target (e.g. GERAN/UTRAN) cell for which LIPA PDN continuity is not provided. An example would occur when UE is in HNB coverage and it has LIPA/SIPTO PDP context. If service continuity is not supported, the PDP context will be released when the SGSN detect that the UE moved out of HNB's coverage. However, the context information between network (SGSN) and UE containing information on the active PDN connections/PDP contexts might be out of synch for a while until a new RAU is performed and the context is synchronized between the UE and the SGSN. Due to the out-of-sync context, the UE in the meanwhile considers the PDP context corresponding to the LIPA connection still active.

Mobility for NAS-Idle UE There a number of problem cases that arise when the LIPA connection is disconnected during idle mode mobility and the UE enters NAS connected mode after performing idle mobility outside the H(e)NB.

In a first problem case, the UE 1416 moves from a HeNB cell coverage 1420 to a second position 1516 at a target cell 1412 (e.g., an eNB or an HeNB cell) for which continuity shall not be provided. After moving to the target cell, the UE 1516 may perform a SERVICE REQUEST in a target (e.g., an E-UTRA) cell which is not directly connected to the residential/enterprise network. On receiving SERVICE REQUEST (SR) from the UE via the target cell, the MME 1414 determines it cannot service the SR and needs to release the LIPA PDN connectivity 1430,. The MME 1414 releases the LIPA PDN connectivity 1430 by rejecting the service request and disconnecting the LIPA PDN connectivity if the UE has other active PDN connections. On the other hand, if the UE has only LIPA PDN connection before it enters ECM-IDLE mode, a release of the LIPA PDN connection results in UE not having any active PDN connections left, resulting in the UE being detached from the network by the MME without the UE being correctly informed since the current specifications do not require that the MME indicate why the UE is being detached.

in another problem case, the UE 1416 moves from a HeNB 1420 to GERAN/UTRAN (not shown). In this case, the IDLE mode UE performs Tracking Area Update (TAU) in an E-UTRAN cell where LIPA service continuity is not provided. In particular, the UE will perform TAU in IDLE mode when (1) the UE enters into a new Tracking Area (TA) that is not in the list of TAIs that the UE obtained from the MME at the last registration (attach or TAU); and (2) the periodic TA update timer has expired. If the target cell is not directly connected to the residential/enterprise network when the UE performs the TAU, the MME needs to disconnect the active LIPA PDN connection, but the current specifications do not specify how the MME behaves in the presence of LIPA connections since the MME needs to release such PDN connections.

In another problem case, the UE moves from a HNB to GERAN/UTRAN. In this case, the IDLE mode UE (which has at least one LIPA PDN connection through HeNB) performs a Routing Area Update. In particular, the UE performs RAU when the UE enters into a new Routing Area (RA), and when the RAU timer expires. The new SGSN sends a CONTEXT REQUEST message to the old MME during the RAU, and the MME responds with a CONTEXT RESPONSE message. Upon determining that the UE has moved to a cell for which LIPA PDN continuity cannot be supported, the network disconnects the LIPA connection, but the current specifications do not specify whether the MME or SGSN shall trigger the disconnection and how.

Delay In Discovery Loss of Connectivity in Active Idle Mobility There area number of problem cases that arise from idle mode mobility when there is a delay in discovering that connectivity has been lost, with or without Idle mode Signaling Reduction (ISR).

In an example problem case, the UE 1416 moves between a HeNB 1420 and an eNB 1412, or between a HNB and macro GERAN/UTRAN, or between HeNBs (respectively HNBs) belonging to different CSGs and for which LIPA continuity shall not be provided. If the UE moves in idle mode within the Routing Area (RA)/Tracking Area (TA), the UE does not perform NAS signaling to register its location with the network. If there is a significant delay before the UE performs any NAS signaling or the UE transmits data, the UE does not realize it has lost connectivity, which can be a problem, such as for push services when the data to be delivered to the UE cannot be delivered.

In another problem case, the UE moves from a HeNB to a GERAN/UTRAN cell where ISR is active. When idle mobility is performed by the UE from the H(e)NB to a cell for which LIPA PDN connectivity shall not be supported and ISR is active and the UE moves within the ISR area, the UE does not perform NAS signaling to register its location with the network, and therefore it may be a long time before the UE performs any NAS signaling (unless it needs to transmit data) and before the UE realizes it has lost connectivity. Such loss of connectivity can be a problem for push services since the data to be delivered to the UE cannot be delivered. In addition, if the UE was using a push-service that used the LIPA PDN connection or was using the default bearer of the LIPA PDN connection to transport the data to the UE, the UE will not be able to receive any pushed data until it realizes it has been disconnected and until it has performed recovery action, such as re-attaching. Since a RAU (that will synchronize the UE and the SGSN contexts) or keep alive mechanisms of the push-service may happen long after idle mode mobility, the UE will not receive any data pushed from the push-service, whereas if the UE had been informed of the disconnection of the LIPA PDN, it could have reconnected to the push service as appropriate from the target cell with a new PDP context.

Delay in Discovery Loss of Connectivity in Active Mode Mobility There number of problem cases that arise from active mode mobility when there is a delay in discovering that connectivity has been lost.

In an example problem case, the UE in connected mode moves from HeNB to GERAN/UTRAN when ISR is active, resulting in a delay in discovery of loss of connectivity. This problem exists if a UE that performed the inter-RAT HO and finds itself without RABs for a given PDP context is allowed to still consider the PDP context active. When handover is performed by a UE that is active for a non-UPA PDN from the H(e)NB cell coverage to a target (e.g., GERAN/UTRAN) cell wherein LIPA PDN connectivity is not supported, the PDP context corresponding to the LIPA PDN connection is disconnected. When ISR is active, the UE will not perform the RAU at the end of the handover if the handover is towards a RA in the ISR area. However, unless the UE is informed immediately, the UE may believe the PDP context corresponding to the LIPA PDN is still connected since, even if there are no RABs active for such connection, the UE still believes the PDP context is active. If the UE was using some push-service over the LIPA PDN connection, the UE will not be able to receive any pushed data until it realizes it has been disconnected. Also, since a RAU (that will synchronize the UE and the SGSN contexts) or keep alive mechanisms of the push-service may happen after a long-while from the handover, the UE will lose any data pushed from the push-service, whereas if the UE had been informed of the disconnection of the LIPA PDN, it could have reconnected to the push service as appropriate from the target cell with a new PDP context.

In another problem case, the UE in connected mode moves from HNB cell coverage to macro (e.g. GERAN/UTRAN) cell coverage, resulting in delay in discovery of loss of connectivity. If the UE performs handover from HNB to a target GERAN/UTRAN cell wherein LIPA PDN connectivity is not supported, the PDP context is disconnected. However, the UE may not perform a RAU as part of the handover, in which case the UE and the SGSN are not synchronized with respect to the active PDP context information.

Delay In Disconnection For Idle Mode Mobility There is a timing-related problem which is orthogonal to the other problem cases, and the solution may benefit both idle mode mobility and active mode mobility. In this case, when the UE 1416 moves outside the coverage of the H(e)NB 1420, the LIPA connection is released upon detection, and then re-established when the UE 1416 moves back within the coverage of the H(e)NB 1420. However, there may be situations where the UE 1416 may return to the H(e)NB 1420 soon, or may keep moving back and forth between the H(e)NB 1420 and the macro coverage. In these scenarios, the LIPA connection will be established and released repeatedly, resulting in significant signaling overhead. As a result, it may be desirable o delay the release of the LIPA connection when the UE 1416 moves outside the coverage of the H(e)NB 1420 in order to optimize the scenario where the UE 1416 returns to the H(e)NB 1420 relatively quickly.

Handover to GERAN/UTRAN triggered by Circuit Switched Fallback There a number of problem cases that arise when a UE connected to a HeNB can be combined attached for CSFB services, such as when handover to GERAN/UTRAN is triggered by CSFB.

In an example problem case, the UE can have a LIPA PDN connection and zero or more non-LIPA PDN connections through the core network. When the CSFB is triggered for Mobile Originated (MO) or Mobile Terminated (MT) services, a PS HO of the data bearers may be triggered by the HeNB and is allowable by the network because the target cell supports DTM and the PS HO as part of the CSFB procedure. In this case, the network hands over the non-LIPA PDN connections and disconnects the LIPA PDN connections or, if there are only LIPA PDN connections, the MME rejects the PS HO. If the MME rejects the PS HO, CSFB for either MO or MT will consequently fail. In case the PS HO is possible, but the UE or network fails to support DTM, then upon initiating conditions, the GERAN PS bearers will be suspended. If the target cell is a GERAN cell and DTM is not supported in the target cell, the UE will suspend the PS bearers (including the ones corresponding to the LIPA PDN connection). Once the CS service that triggered the CS fallback is terminated, the UE may move back to E-UTRAN and resume the PS bearers, or may stay in GERAN and resume the PS bearers. If the UE moves back to the original H(e)NB, then the LIPA PDN connection can be resumed based on current CSFB and EPS mechanisms. For example, when the UE performs NAS signaling towards the MME (e.g., with a Service Request or TAU), the MME resumes the suspended bearers.

In another problem case, the UE can have a LIPA PDN connection and zero or more non-LIPA PDN connections through the core network. When the CSFB is triggered for MO or MT services, a PS HO of the data bearers may not be performed. If the PS HO is not performed as part of the fallback procedure and the UE has suspended the PS bearers, and if the UE moves back to E-UTRAN, then the UE performs NAS signaling (e.g., Service Request or TAU) to the MME. The UE might move back to a target E-UTRAN cell which is different from the original HeNB cell. Such target E-UTRAN cell can be a macro cell or a HeNB with a different CSG ID. Assuming that service continuity (i.e., mobility) for a LIPA PDN connection is not allowed between the original HeNB (i.e., where the LIPA PDN connection was created) and the target HeNB, then the MME ensures that the LIPA PDN connection is disconnected. Also, if the target E-UTRAN cell is a macro cell, then the MME ensures that the LIPA PDN connection is disconnected.

Maintaining LIPA PDN Connectivity In Future Networks In post release 10 networks, LIPA continuity will be enabled, so there will be problems associated with maintaining LIP PDN connectivity. In such future cases, a UE will need to know whether it is connecting to a network that supports LIPA continuity or not. Therefore, a UE cannot know whether, upon moving outside the coverage of a H(e)NB, session continuity is provided or not.

In view of the foregoing problem cases associated with LIPA connection releases, there are described and disclosed herein a number of solutions that may be applied to manage the identified connection release problems. For example, MME-initiated PDN connection release procedures may be combined with handover procedures for releasing a PDN connection when the UP moves outside the coverage of the H(e)NB in most cases (and similarly the SGSN-initiated PDP context deactivation procedure). However, there are other solutions disclosed hereinbelow wherein, upon creation of a PDN connection/PDP context in a HeNB/HNB, the MME/SGSN stores in the context information related to the UP an indication of whether such connection is a LIPA PDN connection PDN connection or not. In addition, the solutions include configuring the UE (e.g. by the operator or the user) on whether to reconnect the PDN corresponding to a certain APN or service if, due to mobility from a H(e)NB where the UP was connected in LIPA to such PDN to a target cell for which LIPA continuity is not provided, such PDN connection was disconnected by the network. Alternatively, the UE may be configured to not reconnect the PDN that was disconnected due to UE mobility.

Description of Embodiments

In selected embodiments, the operator conf gyres the UE using an OMA DM management object (MO) to contain an indication of whether any PDN that was disconnected due to lack of LIPA service continuity needs to be reconnected. The UE may also be configured to contain a list of APNs for which the PDN needs to be reconnected if the PDN that was disconnected due to lack of LIPA service continuity. In other embodiments, the UE is configure to contain an indication of availability of LIPA service continuity (i.e., only between CSG cells for which the UE is a member of the CSG or if not roaming or if mobility to macro occurs or if mobility to macro occurs+open CSG cells occurs). By default, this indication can be set to some value, e.g. to no LIPA service continuity available. The UE may also be configured to contain a list of indicators for a PDN connection with certain characteristics (i.e., an indication the PDN connection can be used for IMS or an indication requesting to receive P-CSCFs in the response message from the network). A configured UE may also contain an indication of whether disconnecting non-LIPA is allowed if emergency call with insufficient credentials is not allowed, and/or an indication of whether a UE retains at least two PDN connections where one of the PDN connections is to either a particular APN or to a default APN (known to terminate by a non PGW) when not in PS mode 2 of operations.

In selected embodiments, when the UE activates a LIPA PDN connection, the MME stores the pair of CSG ID and the APN for the LIPA PDN connection where a LIPA PDN connection is activated at the CSG ID cell. In other embodiments, when the UE activates a LIPA PDP context, the SGSN stores the pair of CSG ID and the APN for the LIPA PDP context where the LIPA PDP context is activated at the CSG ID cell.

In some embodiments, the UE activating a LIPA PDN connection or the UE activating a LIPA PDP context includes the UE sending a PDN connection request to the MME or the MME receiving a PDN connection request from the or the UE sending an attach request to the MME or the MME receiving an attach request from the UE or the UE sending a PDP context request to the SGSN or the SGSN receiving a PDP context request from the UE.

As used herein, a LIPA PDN connection is a PDN Connection that the MME authorizes for connectivity to a PDN GW for a UE connected to a HeNB based on a request from the UE for LIPA connectivity and based on the CSG ID of the HeNB. Alternatively, a LIPA PDN Connection is PDN Connection which was activated by the UE requesting LIPA connectivity type "LIPA" and the MME informing the UE of the connectivity type provided.

In this solution, the TAU procedure is always initiated by the UE and is used for a number of purposes, including synchronizing the UE EPS bearer context with the MME EPS bearer context for UE mobility where the source cell is a CSG cell and the target cell is not a CSG cell, when the UE has at least one LIPA PDN connection. The TAU procedure is also used to synchronize the UE EPS bearer context with the MME EPS bearer context for UE mobility where the source cell is a CSG cell and the target cell is a CSG cell, and where the target cell's CSG-ID is not the source cell's CSG-ID, when the UE has at least one LIPA PDN connection.

Figure 11:
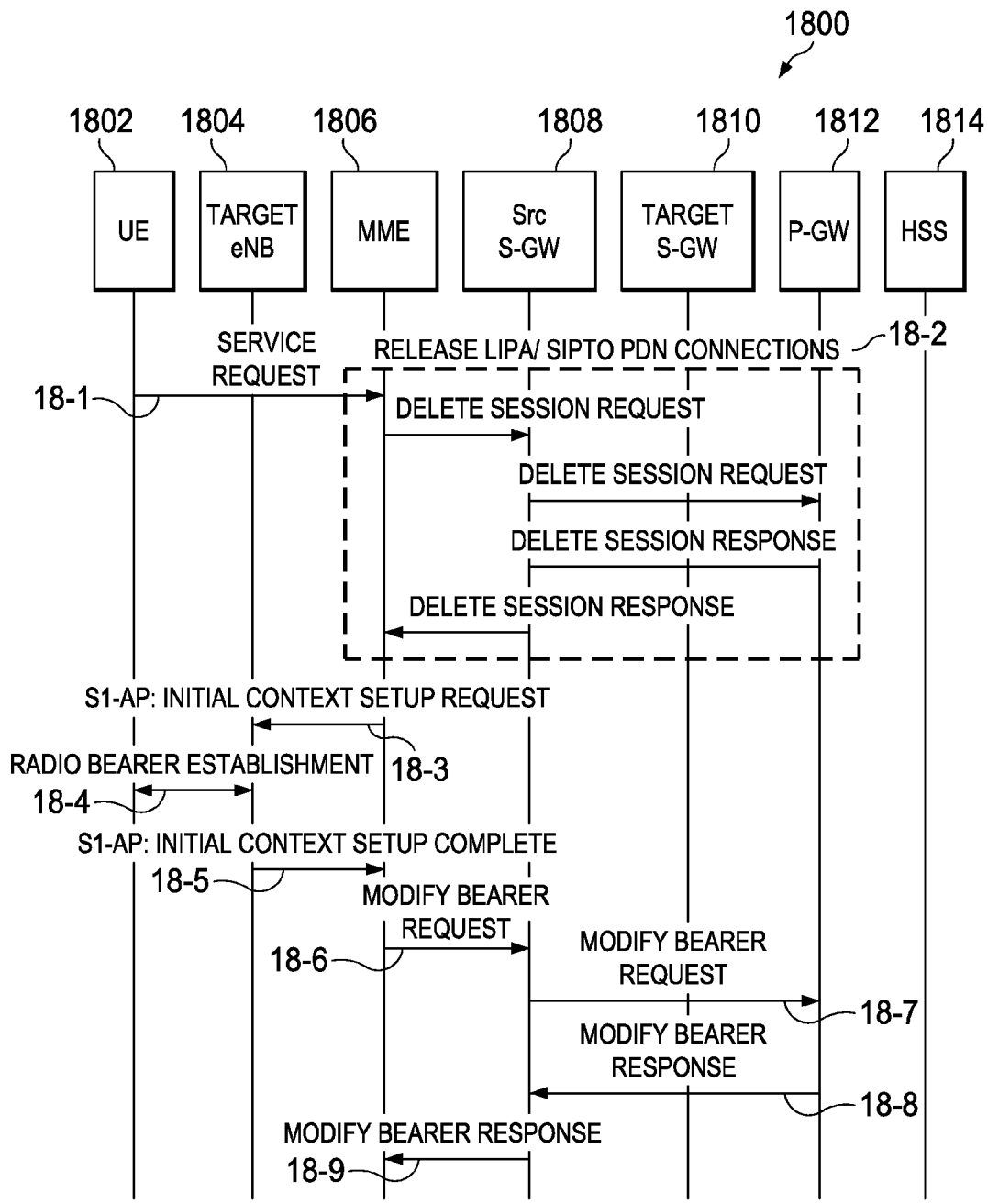
FIG. 11 is a signal flow diagram illustrating a LIPA/SIPTO PDN disconnect procedure implemented as part of a service request procedure where the MME provides bearers for all EPS bears excluding the LIPA/SIPTO hearers.

Embodiments: MME releases LIPA/SIPTO PDN connections before sending Initial Context Setup Request message In accordance with selected embodiments, another solution is described with reference to FIG. 11, and addresses the case of NAS idle mode mobility where the UE enters NAS connected mode after performing idle mobility outside the H(e)NB. In this solution, if a UE 1802 sends a Service Request (SR) to the MME 1806 from a cell for which LIPA/SIPTO service continuity is not provided for a LIPA PDN connection previously established in a HeNB, the MME 1806 releases LIPA/SIPTO PDN connections before sending an Initial Context Setup Request message to the target eNB 1804.

The applied assumptions in this case are that (1) the UE had a PDN connection that goes through the core network as well as LIPA PDN connection before it enters into IDLE mode, (2) Service Continuity for the LIPA and SIPTO local is not supported, (3) the UE is in ECM-IDLE mode before the UE sends SERVICE REQUEST, and (4) MME relocation is not involved.

In operation, a UE 1802 sends a Service Request (signal flow 18-1) to the MME 1806 from a cell which does not provide LIPA/SIPTO service continuity for a previously established LIPA PDN connection in a HeNB. Upon receiving SR from the UE 1802, MME 1806 discovers that the UE 1802 is connected to a cell to which LIPA/SIPTO service continuity is not provided. Before the MME 1806 sends an Initial Context Setup Request message to the target eNB 1804 (signal flow 18-3), the service request is treated at the MME 1806 (signal flow 18-2) by providing bearers for all the EPS bearers excluding the LIPA bearers if there are PDN connections that are not LIPA PDN connections. The rest of procedure (signal flows 18-4 through 18-9) follows UE-initiated Service Request. procedures.

Embodiments: Selected CSFB with PS HO Another solution is described that addresses the case of handovers to GERAN/UTRAN that are triggered by CS Fallback with PS HO. In this network-based solution, the MME performs the handover preparation and execution during the CSFB procedure only for the non-LIPA PDN connections.

In operation, if the UE has one or more active PDN connections in addition to one or more LIPA PDN connections, then pursuant to triggering the PS HO to GERAN/UTRAN during the CSFB procedure, the MME performs handover preparation and execution only for the non-LIPA PDN connections and the MME requests RAB allocation in the target system only for the non-LIPA connections or for all the PDN connections excluding the LIPA PDN connection or by not requesting RAB allocation in the target system for LIPA PDN connections. After the UE is redirected to GERAN/UTRAN, the MME releases the LIPA PDN connections. In another embodiment, pursuant to triggering the handover the MME starts a timer T_O. The MME releases the LIPA PDN connections when the timer T_O expires and the UE has not performed the CSFB procedures for returning to E-UTRAN.

Embodiments: CSFB with no PS HO for GERAN with no DTM target cell and UE resumes PS traffic in E-UTRAN In accordance with selected embodiments, additional solutions are provided to address the case of CSFB with no PS HO where the UE resumes PS traffic in HeNB, and addresses the hysteresis with delay disconnection of LIPA connections. In this network-based solution, the MME disconnects the LIPA PDN connections after the CS service has terminated only if the UE returns to E-UTRAN, to a macro target cell, or a different HeNB for which LIPA PDN continuity shall not be supported. In these embodiments, there is no DTM target cell and the UE resume PS traffic in E-UTRAN.

In a first embodiment, the solution applies to a UE that performs CSFB procedures and moves to a target GERAN network or cell that does not support dual transfer mode (DTM), or to a UE that does not support DTM. In this case, the MME disconnects the LIPA PDN connections only if the UE performs the CSFB procedures for returning to E-UTRAN and returns to a E-UTRAN cell that is not a CSG cell or to a E-UTRAN CSG cell for which LIPA PDN continuity is not supported (such as a E-UTRAN CSG cell with a CSG ID different from the CSG cell where the LIPA PDN connections were created). In this solution, pursuant to the UE triggering CSFB procedures and the PS Handover not being supported or the target network or target cell being a GERAN network or cell that does not support DTM or the UE not supporting DTM, the MME stores the CSG ID of the E-UTRAN cell where the UE triggers the CSFB procedure. The MME maintains such information until the UE returns to E-UTRAN or the UE resumes the PS bearers in GERAN/UTRAN.

On the other hand, if the UE sends NAS signaling to the MME in order to resume the service in E-UTRAN according to current CSFB procedures, then the MME verifies if the UE is resuming the services from a cell with the same CSG ID that the MME stored upon the UE executing the fallback procedure. If services are being resumed from a cell with a different CSG ID or services are resumed from a non-CSG cell or a cell without a CSG ID, then the MME disconnects the LIPA PDN connections. Otherwise, the MME does nothing.

In another embodiment, the MME starts a timer T when the UE suspends the bearer during the fallback procedure. Pursuant to the timer T expiring, if the UE has not performed the CSFB procedures for returning to E-UTRAN or the PS bearers are still suspended, then the MME disconnects the LIPA PDN connections.

In this solution, pursuant to the UE triggering CSFB procedures and the PS Handover not being supported or the target network or target cell being a GERAN network or cell that does not support DTM or the UE not supporting DTM, the MME starts a timer T-P2 and the MME stores the CSG ID of the E-UTRAN cell where the UE triggers the CSFB procedure. The MIME maintains the CSG ID information until the UE returns to E-UTRAN or the UE resumes the PS bearers in GERAN/UTRAN. Pursuant to the timer T_P2 expiring, if the UE has not performed the CSFB procedures for returning to E-UTRAN or the PS bearers are still suspended, then the MIME disconnects the LIPA PDN connections. In addition, if the UE sends NAS signaling to the MME in order to resume the service in E-UTRAN according to current CSFB procedures before the timer T_P2 expires, then the MME resets the time and the MME verifies if the UE is resuming the services from a cell with the same CSG ID that the MME stored upon the UE executing the fallback procedure. If services are being resumed from a cell with a different CSG ID or services are resumed from a non-CSG cell or a cell without a CSG ID, then the MME disconnects the LIPA PDN connections. Otherwise, the MME does nothing.

Embodiments: CSFB with no PS HO and UE resumes PS traffic in GERAN/UTRAN In accordance with selected embodiments, additional solutions are provided to address the case of handovers to GERAN/UTRAN triggered by CS Fallback without PS HO where the UE resumes PS traffic in GERAN/UTRAN. In this solution, the UE performs NAS signaling over GERAN/UTRAN to resume the suspended PS bearers.

In operation, the MME responds to the received CONTEXT REQUEST message from the new SGSN by sending a CONTEXT RESPONSE message. When the MME sends CONTEXT RESPONSE to the target SGSN, the MME omits the information regarding LIPA/SIPTO PDN connection(s) so that the target SGSN does not create a PDP context for the corresponding LIPA PDN connection. However, the solution is triggered by the UE performing NAS signaling over GERAN/UTRAN to resume the suspended PS bearers.

Figure 12:
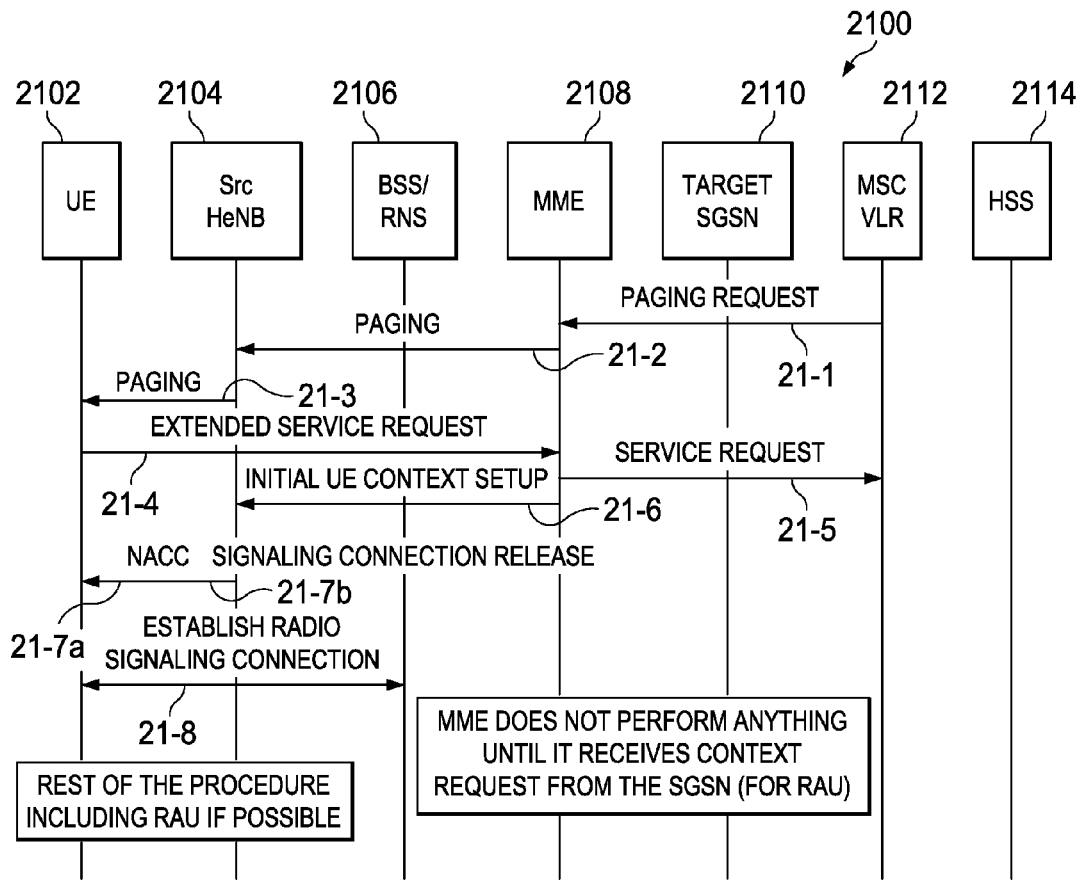
FIG. 12 is a signal flow diagram illustrating a LIPA/SIPTO PDN disconnect procedure where a circuit switched fall back (CSFB) call causes the MME to send an Initial UE Context Setup message with zero active PDN connections to implicitly detach the UE from the network.

Embodiments: Handover to GERAN/UTRAN triggered by CS Fallback In accordance with selected embodiments, additional solutions are described with reference to FIG. 12, and address the case of handovers to GERAN/UTRAN triggered by CS Fallback when there is no PS HO and there is a mobile terminated call. In operation, a UE 2102 that has only LIPA PDN connections active triggers the PS HO to GERAN/UTRAN during the CSFB procedure. In response, the MIME 2108 decides that no PS HO shall be performed for the PS bearers, based on the fact that the target cell is GERAN/UTRAN and that the UE has only LIPA PDN connections. After the UE 2102 is redirected to GERAN/UTRAN, the MME 2108 keeps the UE context information until UE performs RAU.

As described below, a second example embodiment differs from the first one in terms of when the MME initiated the cell reselection procedure. The second example embodiment covers in addition the general case of inter-RAT handover.

In a selected embodiment, the UE 2102 has only LIPA/SIPTO PDN connections. When the HO from the HeNB 2104 to GERAN/UTRAN is triggered due to CSFB, Initial UE Context Setup Request from MME 2108 to HeNB 2104 indicates that the PS HO is not available. HeNB 2104 informs the UE 2102 to move into the target GERAN/UTRAN cell, either by using Network Assisted Cell Change or by triggering RRC signaling connection release with redirection to GERAN/UTRAN.

At signal flow 21-1, the MME 2108 receives a Paging Request (IMSI, VLR TMSI, Location Information) message from the MSC 2112 over a SGs interface. The MME 2108 then pages the UE in all the TAs.

At signal flow 21-2, the MME 2108 sends a Paging message to each eNodeB. The Paging message includes a suitable UE Identity (i.e. S-TMSI or IMSI) and a CN Domain Indicator that indicates which domain (CS or PS) initiated the paging message. In this case it shall be set to "CS" by the MME.

At signal flow 21-3, the radio resource part of the paging procedure takes place whereby the eNodeB 2104 sends the paging message to the UE 2102. The message contains a suitable UE Identity (i.e. S-TIMSI or IMSI) and a CN Domain indicator.

At signal flow 21-4, the UE 2102 establishes an RRC connection and sends an Extended Service Request (CS Fallback Indicator) to MME 2108. The UE 2102 indicates its S-TMSI in the RRC signaling. The Extended Service Request message is encapsulated in RRC and S1-AP messages. The CS Fallback Indicator indicates to the MME that CS Fallback for this UE should be performed. In case of Mobile Originated (MO) CSFB, signal flow 21-1 through 21-3 are not performed.

At signal flow 21-5, the MME 2108 sends the SGs Service Request message to the MSC 2112 containing an indication that the UE 2102 was in idle mode (and hence, for example, that the UE has not received any Calling Line Identification information). Receipt of the SGs Service Request message stops the MSC 2112 from retransmitting the SGs interface Paging message.

At signal flow 21-6, the MME 2108 sends S1-AP: Initial UE Context Setup (UE capabilities, CS Fallback Indicator and other parameters) to notify eNodeB to move the UE 2102 to UTRAN/GERAN. The MME 2108 determines that PS HO cannot be performed based on the fact that the UE has only LIPA PDN connections and the LIPA service continuity is not supported and indicates in this message that PS HO is not available for the UE 2102. The eNB shall reply with S1-AP: Initial UE Context Setup Response message (not shown). As HeNB 2104 determines that PS HO is not available, the HeNB 2104 performs either signal flow 21-7a or 21-7b instead of sending HO REQUIRED message to the MME 2108.

In signal flow 21-7a, if the target cell is GERAN, the HeNB 2104 can trigger an inter-RAT cell change order (optionally with Network Assisted Cell Change (NACC)) to a GERAN neighbor cell by sending an RRC message to the UE 2102. The inter-RAT cell change order may contain a CS Fallback indicator which indicates to UE 2102 that the cell change order is triggered due to a CS fallback request.

In signal flow 21-7b, the HeNB 2104 can trigger RRC connection release with redirection to GERAN or UTRAN instead of PS HO or NACC. If the UE 2102 and network support "RRC connection release with redirection and Multi Cell System Information to GERAN/UTRAN", the HeNB 2104 can trigger RRC connection release with redirection to GERAN or UTRAN and include one or more physical cell identities and their associated System Information.

At signal flow 21-8, the UE establishes the RRC connection and then performs the rest of procedure for CSFB which may include RAU. As it is possible that the target SGSN 2110 sends CONTEXT REQUEST message to the source MME 2108 as a part of RAU procedure, the MME 2108 does not release the context information of the UE 2102 until it receives the CONTEXT REQUEST message. On receiving the CONTEXT REQUEST message, the MME 2108 returns CONTEXT RESPONSE with zero active PDN connections and implicitly detaches the UE 2102 from the network.

Figure 13:
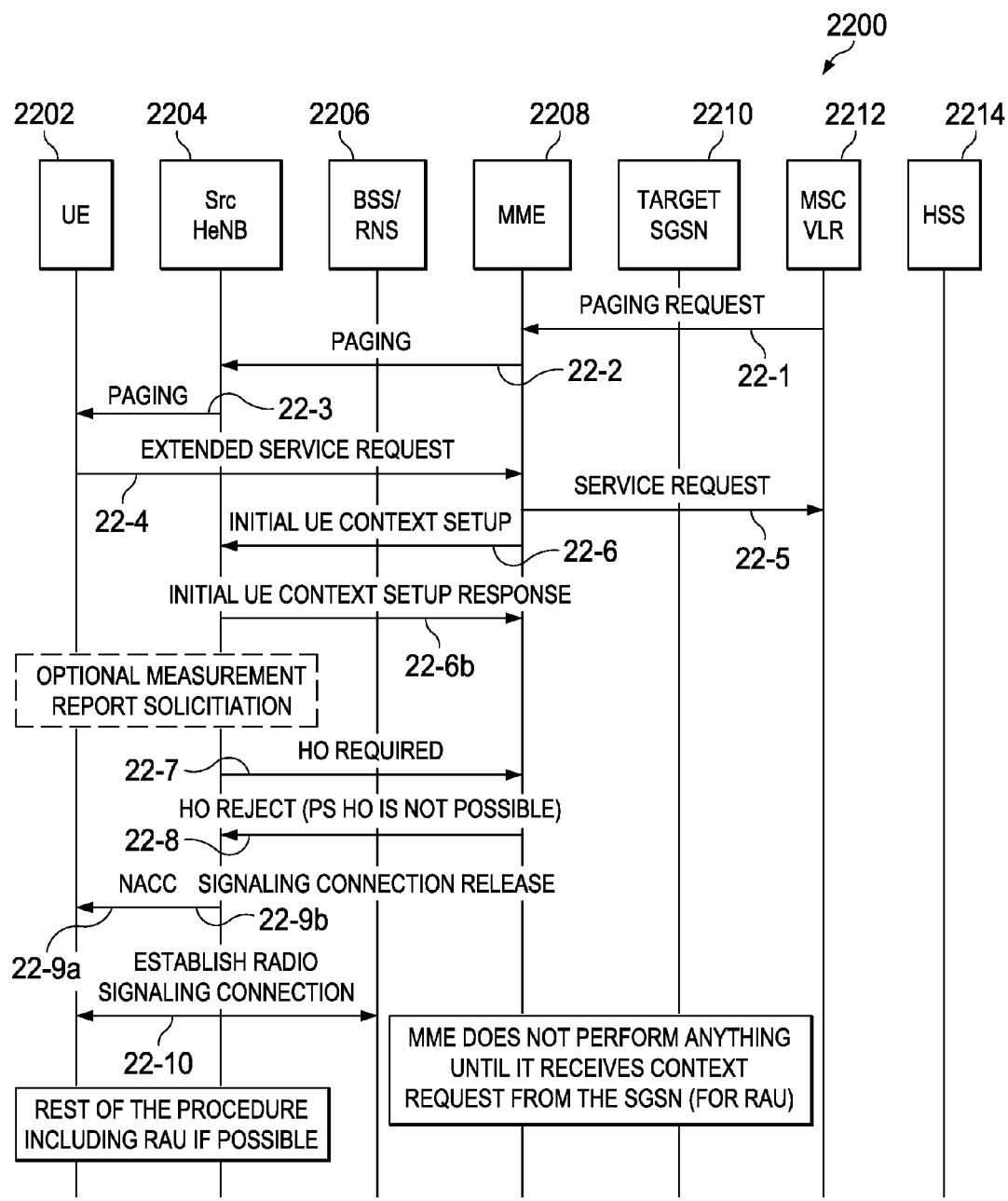
FIG. 13 is a signal flow diagram illustrating a LIPA/SIPTO PDN disconnect procedure where a circuit switched fall back (CSFB) call causes the MME to send an HO Reject message indicating that the PS HO is not possible to implicitly detach the UE from the network.

In accordance with selected embodiments, additional solutions are described with reference to FIG. 13 for the case where the UE 2202 has only LIPA/SIPTO PDN connections. In this procedure signal flows 22-1 through 22-6 in FIG. 13 are similar to signal flows 21-1 through 21-6 in FIG. 12. However, instead of receiving the information that PS HO is not available for the UE in the Initial UE Context Setup message, this information (that PS HO is not available for the UE) is delivered to the HeNB 2204 on the HO PREPARATION FAILURE message (at signal flow 22-8) after sending the HO REQUIRED to the MME 2208 (at signal flow 22-7). The cause value of the HO PREPARATION FAILURE message will be "PS HO Not Available." Though this solution may include one more message handshake rounds, this solution can be reused for the case of IRAT HO due to UE's mobility.

Figure 6:
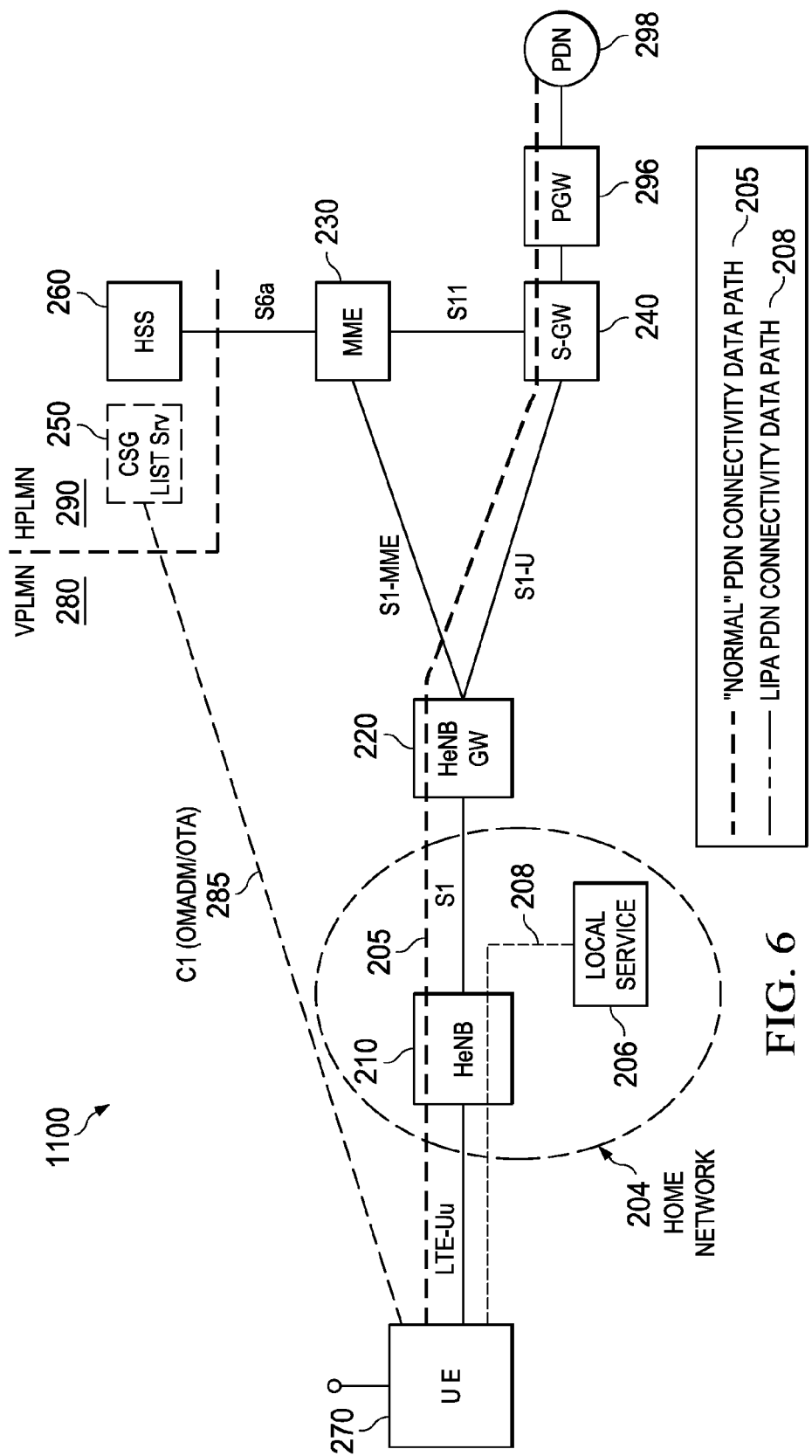
FIG. 6 is a schematic diagram of the example logical architecture for use in a HeNB cell illustrating Local IP connectivity.
Figure 7:
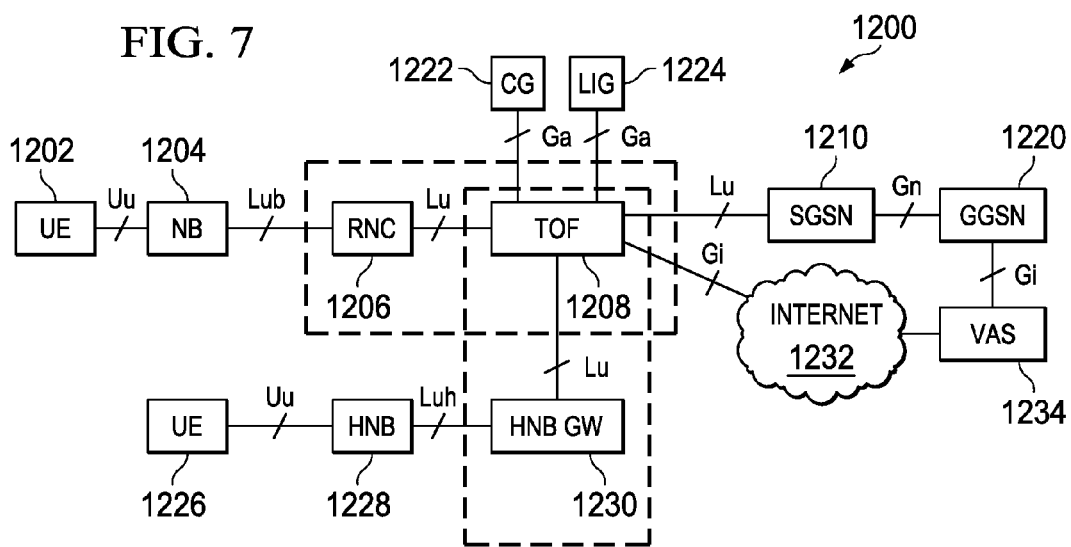
FIG. 7 is a schematic diagram of an example logical architecture for deploying Selected IP Traffic Offload at Iu-PS.
Figure 8:
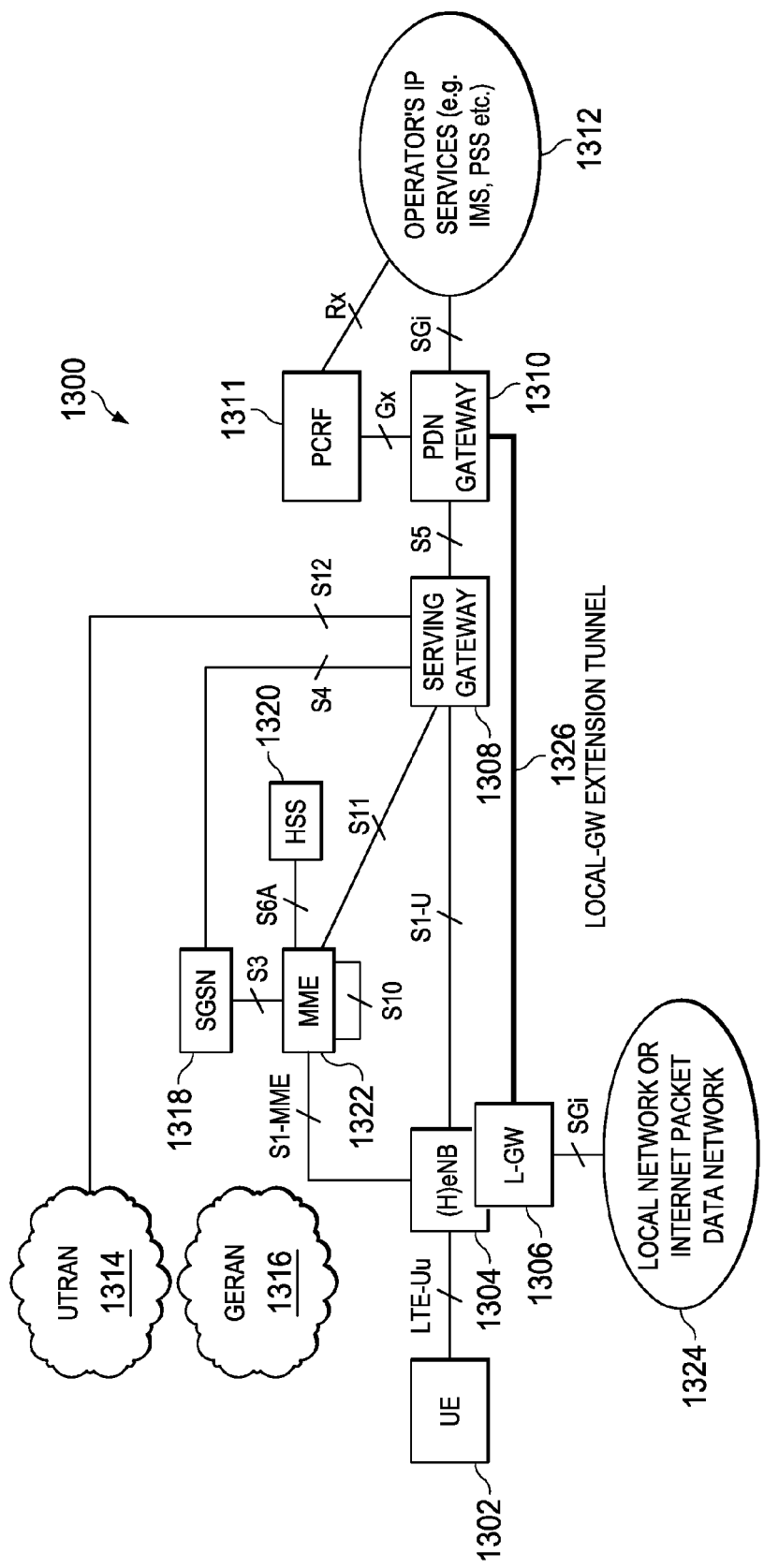
FIG. 8 is a schematic diagram of an example logical architecture for a proposed extension of non-roaming architecture for 3GPP accesses for SIPTO and LIPA.

In accordance with selected embodiments, additional solutions are described for the case of a UE/mobile originating or UE/mobile terminating CSFB call procedure when PS HO is not supported and Where the UE has only LIPA PDN connections. This procedure is illustrated with reference to the signal flow for a CS Call Request E-UTRAN or Call in GERAN/UTRAN without PS HO depicted in FIG. 6.3-1 of 3GPP TS 23.272. According to this solution, the UE receives as signal 3b an RRC connection release from the eNodeB with redirection to GERAN or UTRAN if the HeNB determines that the UE only has LIPA PDN connections based on the existence of a Correlation Identifier (ID). In this solution, if the PDN connection is established for LIPA, the S1 control message signal 1b from the MME to the HeNB includes a Correlation ID per EPS bearer for enabling the direct user plane path between the HeNB and the L-GW. In Release 10 of the 3GPP specification, the Correlation ID is set equal to the user plane PDN GW TEM (GTP-based S5) or GRE key (PMIP-based S5). Thus, the detecting by the HeNB of the Correlation ID in the S1 control message from the MME indicates that the corresponding EPS bearer is for LIPA.

PDN Address

The purpose of the PDN address information element is to assign an IPv4 address to the UE associated with a packet data network and to provide the UE with an interface identifier to be used to build the IPv6 link local address. The PDN address information element is coded as shown in Tables 1 and 2 below.

TABLE 1

PDN address information element

| 8 | 7 | 6 | 5 | 4 | 3 | 2 | 1 | |
|---|---|---|---|---|---|---|---|---|
| PDN address IEI | | | | | | | | octet 1 |
| Length of PDN address contents | | | | | | | | octet 2 |
| 0 | 0 | 0 | Service Continuity Flag | | | PDN type value | | octet 3 |
| PDN address information | | | | | | | | octet 4 |
| | | | | | | | | octet 15 |

As shown above in Table 1, the PDN address is a type 4 information element with minimum length of 7 octets and a maximum length of 15 octets.

TABLE 2

PDN address information element

PDN type value (octet 3)
Bits
3 2 1
0 0 1  IPv4
0 1 0  IPv6
0 1 1  IPv4v6

TABLE 2-continued

PDN address information element

All other values are reserved.
Bit 4 to 8 of octet 3 are spare and shall be coded as zero.
PDN address information (octet 4 to 15)
If PDN type value indicates IPv4, the PDN address information in octet 4 to octet 7 contains an IPv4 address. Bit 8 of octet 4 represents the most significant bit of the IPv4 address and bit 1 of octet 7 the least significant bit.
If PDN type value indicates IPv6, the PDN address information in octet 4 to octet 11 contains an IPv6 interface identifier. Bit 8 of octet 4 represents the most significant bit of the IPv6 interface identifier and bit 1 of octet 11 the least significant bit.
If PDN type value indicates IPv4v6, the PDN address information in octet 4 to octet 15 contains an IPv6 interface identifier and an IPv4 address. Bit 8 of octet 4 represents the most significant bit of the IPv6 interface identifier and bit 1 of octet 11 the least significant bit. Bit 8 of octet 12 represents the most significant bit of the IPv4 address and bit 1 of octet 15 the least significant bit.
If PDN type value indicates IPv4 or IPv4v6 and DHCPv4 is to be used to allocate the IPv4 address, the IPv4 address shall be coded as 0.0.0.0.

Figure 14:
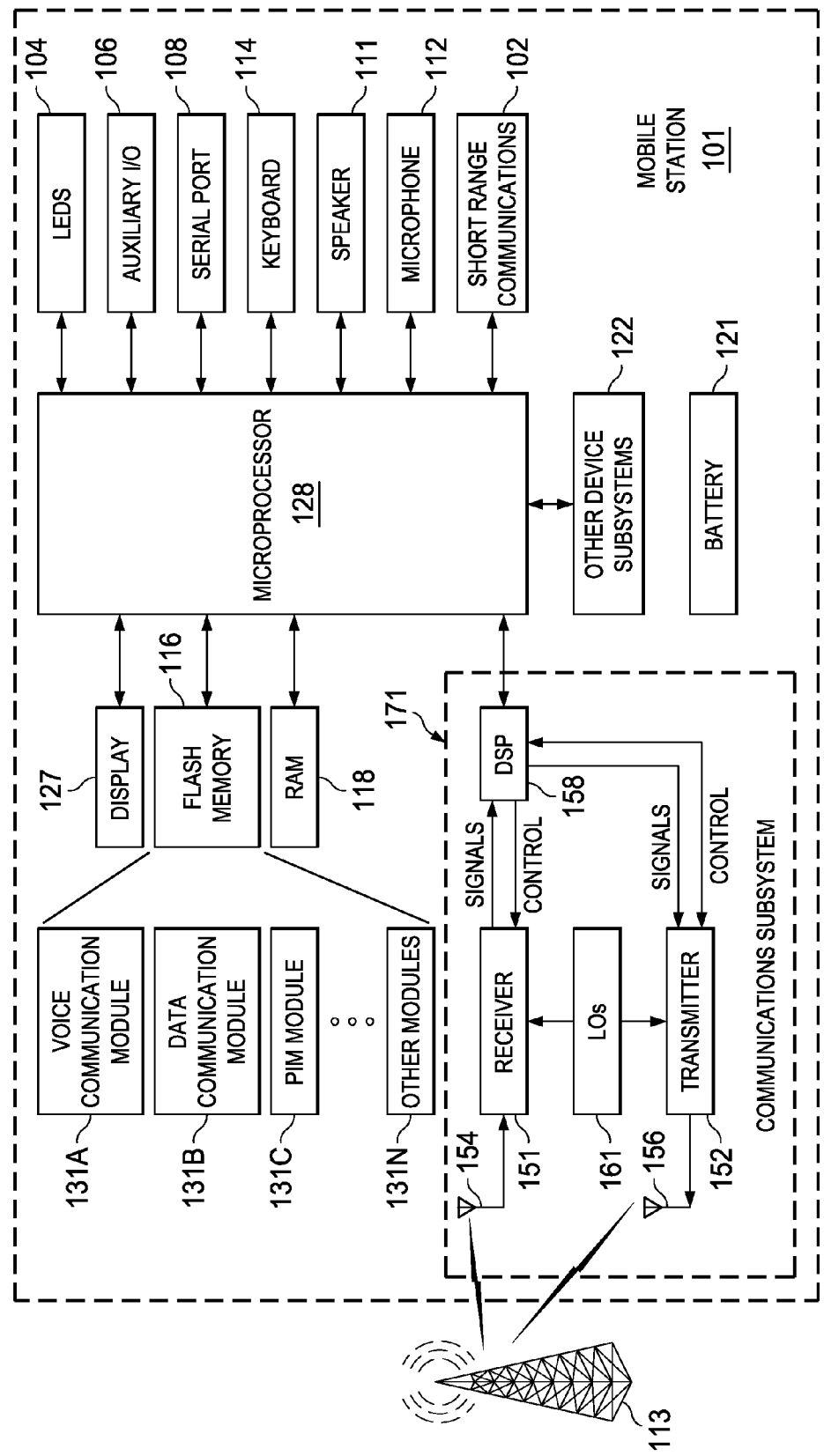
FIG. 14 is a schematic block diagram illustrating exemplary components of a mobile wireless communications device which may be used with selected embodiments of the present disclosure.

Referring now to FIG. 14, there is shown a schematic block diagram illustrating exemplary components of a mobile wireless communications device 101 which may be used with selected embodiments of the present disclosure. The wireless device 101 is shown with specific components for implementing features described above. It is to be understood that the wireless device 101 is shown with very specific details for exemplary purposes only.

A processing device (e.g., microprocessor 128) is shown schematically as coupled between a keyboard 114 and a display 127. The microprocessor 128 controls operation of the display 127, as well as overall operation of the wireless device 101, in response to actuation of keys on the keyboard 114 by a user.

The wireless device 101 has a housing that may be elongated vertically, or may take on other sizes and shapes (including clamshell housing structures). The keyboard 114 may include a mode selection key, or other hardware or software for switching between text entry and telephony entry.

In addition to the microprocessor 128, other parts of the wireless device 101 are shown schematically. These include a communications subsystem 171; a short-range communications subsystem 102; the keyboard 114 and the display 127, along with other input/output devices including a set of LEDs 104, a set of auxiliary I/O devices 106, a serial port 108, a speaker 111 and a microphone 112; as well as memory devices including a flash memory 116 and a Random Access Memory (RAM) 118; and various other device subsystems 122. The wireless device 101 may have a battery 121 to power the active elements of the wireless device 101. The wireless device 101 is in some embodiments a two-way radio frequency (RF) communication device having voice and data communication capabilities. In addition, the wireless device 101 in some embodiments has the capability to communicate with other computer systems via the Internet.

Operating system software executed by the microprocessor 128 is in some embodiments stored in a persistent store, such as the flash memory 116, but may be stored in other types of memory devices, such as a read only memory (ROM) or similar storage element. In addition, system software, specific device applications, or parts thereof, may be temporarily loaded into a volatile store, such as the RAM 118. Communication signals received by the wireless device 101 may also be stored to the RAM 118.

The microprocessor 128, in addition to its operating system functions, enables execution of software applications on the wireless device 101. A predetermined set of software applications that control basic device operations, such as a voice communications module 131A and a data communications module 131B, may be installed on the wireless device 101 during manufacture. In addition, a personal information manager (PIM) application module 131C may also be installed on the wireless device 101 during manufacture. The PIM application is in some embodiments capable of organizing and managing data items, such as e-mail, calendar events, voice mails, appointments, and task items. The PIM application is also in some embodiments capable of sending and receiving data items via a wireless network 113. In some embodiments, the data items managed by the PIM application are seamlessly integrated, synchronized and updated via the wireless network 113 with the device user's corresponding data items stored or associated with a host computer system. As well, additional software modules, illustrated as another software module 131N, may be installed during manufacture.

Communication functions, including data and voice communications, are performed through the communication subsystem 171, and possibly through the short-range communications subsystem 102. The communication subsystem 171 includes a receiver 151, a transmitter 152 and one or more antennas, illustrated as a receive antenna 154 and a transmit antenna 156. In addition, the communication subsystem 171 includes a processing module, such as a digital signal processor (DSP) 158, and local oscillators (LOs) 161. In some embodiments, the communication subsystem 171 includes a separate antenna arrangement (similar to the antennas 154 and 156) and RF processing chip/block (similar to the Receiver 151, LOs 161 and Transmitter 152) for each RAT, although a common baseband signal processor (similar to DSP 158) may be used for baseband processing for multiple RATs. The specific design and implementation of the communication subsystem 171 is dependent upon the communication network in which the wireless device 101 is intended to operate. For example, the communication subsystem 171 of the wireless device 101 may be designed to operate with the Mobitex™, DataTAC™ or General Packet Radio Service (GPRS) mobile data communication networks and also designed to operate with any of a variety of voice communication networks, such as Advanced Mobile Phone Service (AMPS), Time Division Multiple Access (TDMA), Code Division Multiple Access (CDMA), Personal Communications Service (PCS), Global System for Mobile Communications (GSM), etc. Examples of CDMA include 1X and 1x EV-DO. The communication subsystem 171 may also be designed to operate with an 802.11 Wi-Fi network or an 802.16 WiMAX network or both. Other types of data and voice networks, both separate and integrated, may also be utilized with the wireless device 101.

Network access may vary depending upon the type of communication system. For example, in the Mobitex™ and DataTACT™ networks, wireless devices are registered on the network using a unique Personal Identification Number (PIN) associated with each device. In GPRS networks, however, network access is typically associated with a subscriber or user of a device. A GPRS device therefore typically has a subscriber identity module, commonly referred to as a Subscriber Identity Module (STM) card, in order to operate on a GPRS network.

When network registration or activation procedures have been completed, the wireless device 101 may send and receive communication signals over the communication network 113. Signals received from the communication network 113 by the receive antenna 154 are routed to the receiver 151, which provides for signal amplification, frequency down conversion, filtering, channel selection, etc., and may also provide analog to digital conversion. Analog-to-digital conversion of the received signal allows the DSP 158 to perform more complex communication functions, such as demodulation and decoding. In a similar manner, signals to be transmitted to the network 113 are processed (e.g., modulated and encoded) by the DSP 158 and are then provided to the transmitter 152 for digital to analog conversion, frequency up conversion, filtering, amplification and transmission to the communication network 113 (or networks) via the transmit antenna 156.

In addition to processing communication signals, the DSP 158 provides for control of the receive 151 and the transmitter 152. For example, gains applied to communication signals in the receiver 151 and the transmitter 152 may be adaptively controlled through automatic gain control algorithms implemented in the DSP 158.

In a data communication mode, a received signal, such as a text message or web page download, is processed by the communication subsystem 171 and is input to the microprocessor 128. The received signal is then further processed by the microprocessor 128 for an output to the display 127, or alternatively to some other auxiliary I/O devices 106. A device user may also compose data items, such as e-mail messages, using the keyboard 114 and/or some other auxiliary I/O device 106, such as a touchpad, a rocker switch, a thumb-wheel, or some other type of input device. The composed data items may then be transmitted over the communication network 113 via the communication subsystem 171.

In a voice communication mode, overall operation of the device is substantially similar to the data communication mode, except that received signals are output to a speaker 111, and signals for transmission are generated by a microphone 112. Alternative voice or audio I/O subsystems, such as a voice message recording subsystem, may also be implemented on the wireless device 101. In addition, the display 127 may also be utilized in voice communication mode, for example, to display the identity of a calling party, the duration of a voice call, or other voice call related information.

The short-range communications subsystem 102 enables communication between the wireless device 101 and other proximate systems or devices, which need not necessarily be similar devices. For example, the short range communications subsystem may include an infrared device and associated circuits and components, or a Bluetooth™ communication module to provide for communication with similarly-enabled systems and devices.

It should be understood that as used herein, terms such as coupled, connected, electrically connected, in signal communication, and the like may include direct connections between components, indirect connections between components, or both, as would be apparent in the overall context of a particular embodiment. The term coupled is intended to include, but not be limited to, a direct electrical connection.

Although the described exemplary embodiments disclosed herein are described with reference to selected communication systems, the present disclosure is not necessarily limited to the example embodiments which illustrate inventive aspects of the present disclosure that are applicable to a wide variety of network connectivity arrangements. Thus, the particular embodiments disclosed above are illustrative only and should not be taken as limitations upon the present disclosure, as the disclosure may be modified and practiced in different but equivalent manners apparent to those skilled in the art having the benefit of the teachings herein. Accordingly, the foregoing description is not intended to limit the disclosure to the particular form set forth, but on the contrary, is intended to cover such alternatives, modifications and equivalents as may be included within the spirit and scope of the disclosure as defined by the appended claims so that those skilled in the art should understand that they can make various changes, substitutions and alterations without departing from the spirit and scope of the disclosure in its broadest form.

What is claimed is:

1. A method in a first network element of a wireless communications network, the method comprising:
receiving a first message from a mobility management entity (MME), the first message associated with causing a circuit switched fallback (CSFB) procedure to move a User Equipment (UE) from the first network element to a second network element;
determining that Packet Switched Handover (PS HO) is not available for the CSFB procedure because the UE has only one or more Local IP Access (LIPA) packet data network (PDN) connections at the first network element; and
sending a second message to the UE in response to said determining, wherein the second message is a signaling message to trigger a Radio Resource Control (RRC) connection release with redirection to the second network element, where the signaling message to trigger the RRC connection release comprises one or more physical cell identities and associated system information if the second network element is a Global System for Mobile Enhanced Data Rates for Global System for Mobile Evolution Radio Access Network (GERAN) base station or Universal Mobile Telecommunications System Terrestrial Radio Access Network (UTRAN) base station, and the UE and the wireless communications network support "RRC connection release with redirection and Multi Cell System Information to GERAN/UTRAN."

2. The method of claim 1, wherein the second network element is one of a GERAN base station and a UTRAN base station.

3. The method of claim 1, wherein the second message is an RRC message including an Inter-Radio Access Technology (RAT) cell change order to a GERAN neighbor base station if the UE and the wireless communications network support inter-RAT cell change order to GERAN and the second network element is a GERAN base station.

4. The method of claim 1, wherein the signaling message to trigger the RRC connection release with redirection causes a redirection to the second network element, if the second network element is a GERAN or UTRAN base station.

5. The method of claim 1, wherein the first network element is a home evolved node base station (HeNB).

6. The method of claim 1, wherein the first message is a UE context modification request including a CSFB indicator.

7. The method of claim 1, wherein said determining that PS HO is not available for the CSFB procedure comprises detecting an indication in the first message from the MME that PS HO is not available.

8. The method of claim 1, wherein said determining that PS HO is not available for the CSFB procedure is based upon an existence of a bearer for the UE that has an associated correlation identifier.

9. The method of claim 1, wherein the CSFB procedure is related to a mobile originated call.

10. The method of claim 1, wherein the CSFB procedure is related to a mobile terminated call.

11. A first network element for a wireless communications network, comprising:
   at least one processor configured to:
   receive a first message from a mobility management entity (MME), the first message associated with causing a circuit switched fallback (CSFB) procedure to move a User Equipment (UE) from the first network element to a second network element;
   determine that Packet Switched Handover (PS HO) is not available for the CSFB procedure because the UE has only one or more Local IP Access (LIPA) packet data network (PDN) connections at the first network element; and
   send a second message to the UE in response to said determining, wherein the second message is a signaling message to trigger a Radio Resource Control (RRC) connection release with redirection to the second network element, where the signaling message to trigger the RRC connection release comprises one or more physical cell identities and associated system information if the second network element is a Global System for Mobile Enhanced Data Rates for Global System for Mobile Evolution Radio Access Network (GERAN) base station or Universal Mobile Telecommunications System Terrestrial Radio Access Network (UTRAN) base station, and the UE and the wireless communications network support "RRC connection release with redirection and Multi Cell System Information to GERAN/UTRAN."

12. The first network element of claim 11, wherein the first network element comprises a home evolved node base station (HeNB).

13. The first network element of claim 11, wherein the second network element is one of a GERAN base station and a UTRAN base station.

14. A computer program product comprising a non-transitory computer readable storage medium having computer readable program code embodied therein, said computer readable program code when executed causes a first network element of a wireless communications network to:
   receive a first message from a mobility management entity (MME), the first message associated with causing a circuit switched fallback (CSFB) procedure to move a User Equipment (UE) from the first network element to a second network element;
   determine that Packet Switched Handover (PS HO) is not available for the CSFB procedure because the UE has only one or more Local IP Access (LIPA) packet data network (PDN) connections at the first network element; and
   send a second message to the UE in response to said determining, wherein the second message is a signaling message to trigger a Radio Resource Control (RRC) connection release with redirection to the second network element, where the signaling message to trigger the RRC connection release comprises one or more physical cell identities and associated system information if the second network element is a Global System for Mobile Enhanced Data Rates for Global System for Mobile Evolution Radio Access Network (GERAN) base station or Universal Mobile Telecommunications System Terrestrial Radio Access Network (UTRAN) base station, and the UE and the wireless communications network support "RRC connection release with redirection and Multi Cell System Information to GERAN/UTRAN."

15. The computer program product of claim 14, wherein the second network element is one of a GERAN base station and a UTRAN base station.

16. The computer program product of claim 14, wherein first network element is a home evolved node base station (HeNB).

17. The method of claim 1, wherein the first network element is a first base station, and the second network element is a second base station.

18. The method of claim 1, wherein the wireless communications network supporting "RRC connection release with redirection and Multi Cell System Information to GERAN/UTRAN" comprises the wireless communications network supporting RRC connection release with redirection, and Multi Cell System Information to GERAN/UTRAN.

19. The method of claim 11, wherein the one or more LIPA PDN connections are not supported at the second network element.

20. The first network element of claim 11, wherein the first network element is a first base station, and the second network element is a second base station.

21. The first network element of claim 11, wherein the signaling message to trigger the RRC connection release with redirection causes a redirection to the second network element, if the second network element is a GERAN or UTRAN base station.

* * * * *